(12) United States Patent
Arditti Ilitzky et al.

(10) Patent No.: US 10,530,405 B2
(45) Date of Patent: Jan. 7, 2020

(54) COMMUNICATION DEVICE AND METHOD FOR SIGNAL DETERMINATION IN RADIO COMMUNICATION

(71) Applicant: Intel Corporation, Santa Clara, CA (US)

(72) Inventors: David Arditti Ilitzky, Zapopan (MX); Rocio Hernandez Fabian, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/778,240

(22) PCT Filed: Dec. 24, 2015

(86) PCT No.: PCT/US2015/000328
§ 371 (c)(1),
(2) Date: May 23, 2018

(87) PCT Pub. No.: WO2017/111800
PCT Pub. Date: Jun. 29, 2017

(65) Prior Publication Data
US 2018/0351590 A1    Dec. 6, 2018

(30) Foreign Application Priority Data

Dec. 24, 2015  (EP) .................................. 15202687

(51) Int. Cl.
*H04B 1/10* (2006.01)
*H04L 25/03* (2006.01)
(Continued)

(52) U.S. Cl.
CPC ............. *H04B 1/1027* (2013.01); *H04B 1/10* (2013.01); *H04B 1/123* (2013.01); *H04L 25/024* (2013.01); *H04L 25/03* (2013.01); *H04L 25/08* (2013.01)

(58) Field of Classification Search
CPC ........ H04B 1/1027; H04B 1/10; H04B 1/123; H04L 25/024; H04L 25/03; H04L 25/08
See application file for complete search history.

(56) References Cited

U.S. PATENT DOCUMENTS 5,966,684 A     10/1999  Richardson et al.
6,470,047 B1 *  10/2002  Kleinerman ...... H04L 25/03267
                                                    375/232

(Continued)

FOREIGN PATENT DOCUMENTS

WO    2013085331 A1    6/2013

OTHER PUBLICATIONS

Tinsley, K. R. et al., "Methodology for RFI Immune Wireless Platforms: RFI Predictive Modeling" IEEE International Conference on Portable Information Devices, 2007, pp. 1-5.

(Continued)

*Primary Examiner* — Wednel Cadeau
(74) *Attorney, Agent, or Firm* — Viering, Jentschura & Partner MBB

(57) ABSTRACT

A communication device is provided that includes a receiver configured to receive a signal. The communication device further includes a determination circuit configured to determine an interference estimation signal of the received signal based on a first signal sample of the received signal and on an interference signal model. The communication device further includes a correction circuit configured to determine a corrected interference estimation signal based on the determined interference estimation signal and on a second (Continued)

signal sample of the received signal. The communication device further includes a subtraction circuit configured to subtract the corrected interference estimation signal from the received signal.

25 Claims, 9 Drawing Sheets

(51) Int. Cl.
*H04L 25/08* (2006.01)
*H04L 25/02* (2006.01)
*H04B 1/12* (2006.01)

(56) References Cited

U.S. PATENT DOCUMENTS

| | | |
|---|---|---|
| 2004/0203458 A1 | 10/2004 | Nigra |
| 2007/0111664 A1 | 5/2007 | Levin et al. |
| 2009/0257477 A1 | 10/2009 | Khayrallah et al. |
| 2011/0311007 A1 | 12/2011 | Nuutinen et al. |
| 2014/0355469 A1 | 12/2014 | Kang et al. |
| 2015/0005188 A1 | 1/2015 | Levner et al. |
| 2015/0311929 A1 | 10/2015 | Carbone et al. |

OTHER PUBLICATIONS

Moore, John B. et al., "Fixed-Lag Smoothing for Nonlinear Systems with Discrete Measurements", Information Sciences, vol. 6., 1973, pp. 151-160.

Lü, J. H. et al., "Bridge the gap between the Lorenz system and the Chen system", International Journal of Bifurcation and Chaos, vol. 12, Dec. 12, 2002, pp. 2917-2926.

Mazzini, G. et al., "Statistical Approach and Applications to EMI Reduction," ISCAS 2001 Tutorials, 2001.

Laster, J. D. et al., "Interference Rejection in Wireless Digital Communications", IEEE Signal Processing Magazine, 1997, pp. 37-62.

Shin, Dae C., "Adaptive Interference Canceler for narrowband and wideband interferences using higher order statistics", IEEE Transactions on Signal Processing, vol. 42, No. IO, Oct. 1994, pp. 2715-2728.

Baan, W. A. et al., "Radio Frequency Interference Mitigation at the Westerbork Synthesis Radio Telescope: Algorithms, Test Observations, and System Implementation", The Astronomical Journal, vol. 128, Aug. 2004, pp. 933-949.

Kassam, Salem A.; "Signal Detection in Non-Gaussian Noise", Springer-Verlag, New York, Berlin, Heidelberg, London, Paris, Tokyo, 1998, ISBN-13:978-1-4612-8370-6.

Kontorovich, Valeri, "Some comments to Application of Cognition Principle in Wireless Networks", European Wireless 2012, Apr. 18-20, 2012, Poznan, Poland, ISBN 978-3-8008-3426-9 © VDE Verlag GmbH.

International Search Report issued for parrallel PCT application PCT/US2015/000328 (3 pages) dated Aug. 24, 2016.

Extended European Search Report issued for corresponding application No. 15911503.9, dated Aug. 7, 2019, 7 pages (for informational purpose only).

\* cited by examiner

COMMUNICATION DEVICE AND METHOD FOR SIGNAL DETERMINATION IN RADIO COMMUNICATION

CROSS-REFERENCE TO RELATED APPLICATION

The present application is a national stage entry according to 35 U.S.C. § 371 of PCT application No.: PCT/US2015/000328 filed on Dec. 24, 2015, and is incorporated herein by reference in its entirety and for all purposes.

TECHNICAL FIELD

The present description relates to communication devices and methods for signal determination in radio communication.

BACKGROUND

In a scenario, a wireless device receives a signal that may include an interference signal and additive white Gaussian noise. It may be desirable to provide a communication device and a method that may blindly subtract the interference signal in a reliable and efficient manner.

SUMMARY

A communication device is provided that includes a receiver configured to receive a signal. The communication device further includes a determination circuit configured to determine an interference signal of the received signal based on an interference signal model. The communication device further includes a correction circuit configured to determine a corrected interference signal based on the determined interference signal and on a signal sample based on the received signal. The communication device further includes a subtraction circuit configured to subtract the corrected interference signal from the received signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
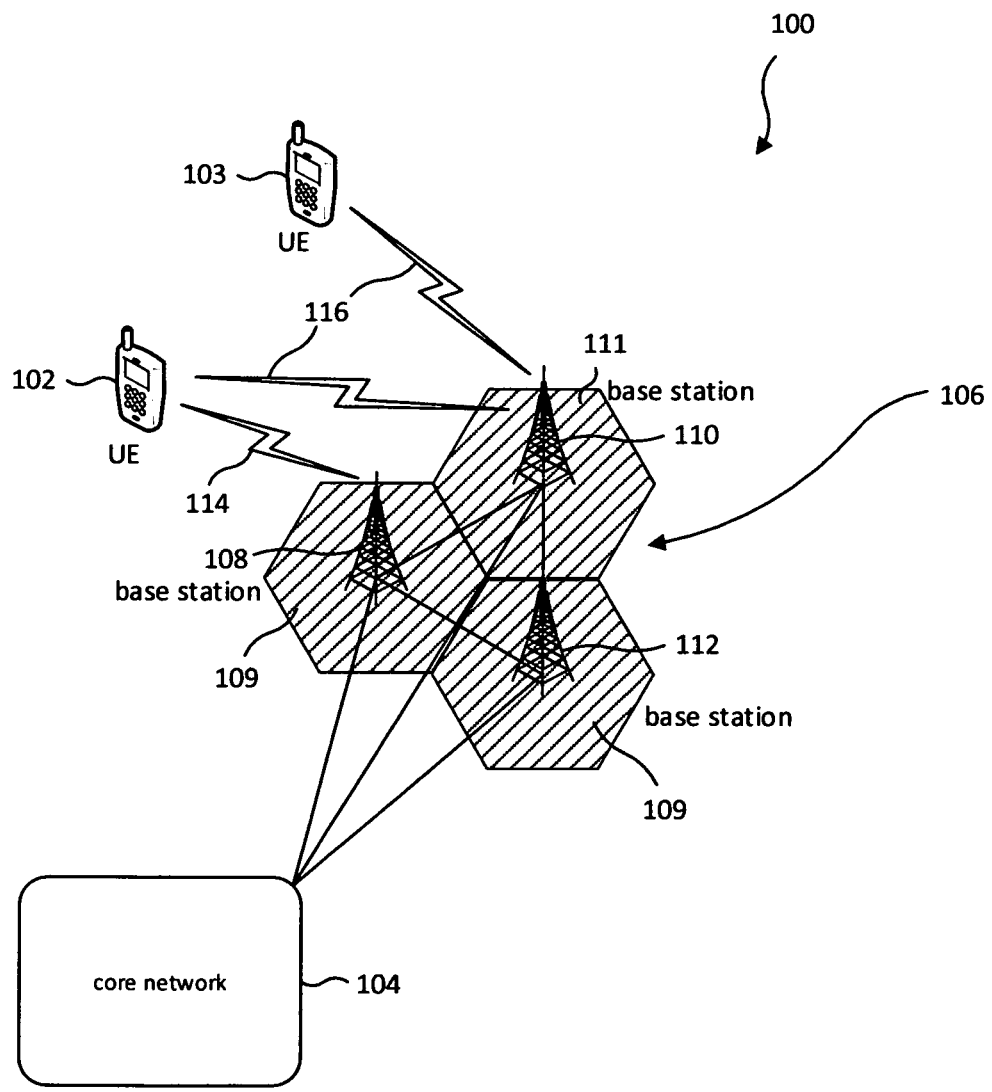
FIG. 1 shows a schematic diagram of a mobile radio communication system, a first wireless mobile device according to an example and a second wireless mobile device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The operator "·" is used herein to mean a matrix multiplication, a scalar product or a multiplication of two scalars depending on the context.

The word "matrix" is used herein to mean a matrix with at least one row and at least one column. In case of a matrix with one row and one column, the matrix may be a scalar and wording referring to that case may be adapted appropriately. For example, the term "covariance" referring to a scalar may be adapted to mean variance.

Various aspects of this description provide a communication device, including a receiver configured to receive a signal. Further, the communication device may include a determination circuit configured to determine an interference estimation signal of the received signal based on an interference signal model. Moreover, the communication device may include a correction circuit configured to determine a corrected interference estimation signal based on the determined interference estimation signal and on a signal sample based on the received signal. Further, the communication device may include a subtraction circuit configured to subtract the corrected interference estimation signal from the received signal. Thus, the communication device may be configured to determine an output signal that excludes an interference signal that may be included in the received signal in a reliable and efficient manner. The output signal may be a subtraction signal that is the subtraction of the corrected interference estimation signal from the received signal. Further, the output signal may include an information signal and a white Gaussian noise signal. The statistical properties of a white Gaussian noise signal included in the received signal and an information signal may be different than the statistical properties of the interference signal.

In an example, the communication device may include a sample circuit configured to sample the signal sample of the signal. Thus, the communication device may be configured to determine a reliable interference estimation signal. Further, a Gaussian noise signal included in the subtraction signal may only have weakly correlated statistics.

In an example, the determination circuit may be configured to determine the interference estimation signal in consideration of interference signal states of a plurality of interference signal states of the interference signal model. Further, the determination circuit may be configured to determine at least one conditional moment of the interference signal states that may be associated with a sampling time of the signal sample based on a time evolution of at least one time dependent conditional moment function. The time dependent conditional moment function may be associated with the interference signal model and may be the at least one conditional moment if evaluated at the sampling time. Moreover, the determined interference estimation signal may include the at least one conditional moment of the interference signal states. Thus, the communication device may be efficient and simple. Further, an interference signal random variable X(t) may be time dependent and may be an interference signal state Z of the plurality of interference signal states with a conditional probability $P[Z,t|C_1, C_2, \ldots, C_n]$. Each conditional probability $P[Z,t|C_1, C_2, \ldots, C_n]$ of the conditional probabilities may be a probability that the interference signal random variable X(t) is the interference signal state Z under the conditions $C_1, C_2, \ldots C_n$. The conditional probability $P[Z,t|C_1, C_2, \ldots, C_n]$ may be time dependent. Further, a conditional probability density function $p[Z,t|C_1, C_2, \ldots, C_n]$ may be the probability $P[Z,t|C_1, C_2, \ldots, C_n]$. Moreover, the at least one conditional moment function may be a conditional expectation value $E[(\phi(X,t)]$ of an interference signal state function $\phi(X,t)$ that may be determined by $E[\phi(X,t)]=\int\phi(Z,t)\cdot p[Z,t|C_1, C_2, \ldots, C_n]\,dZ$ in consideration of the conditional probability density function $p[Z,t|C_1, C_2, \ldots, C_n]$. Further, probability density functions may be referenced as probabilities, respectively. Moreover, the interference signal random variable X(t) may be referenced as interference signal random variable X.

In an example, the at least one conditional moment may be a plurality of conditional moments that may be associated with the sampling time. Further, the at least one time dependent conditional moment function may be a plurality of time dependent conditional moment functions. The plurality of time dependent conditional moment functions may be associated with the interference signal model and may be the conditional moments if evaluated at the sampling time, respectively. Moreover, the time evolution of the plurality of time dependent conditional moment functions may be a time evolution in accordance with at least one coupled differential equation that may include the conditional moment functions of the plurality of time dependent conditional moment functions. Thus, the communication device may be configured to determine a reliable interference estimation signal.

In an example, the at least one coupled differential equation may include a first differential equation (1) and a second differential equation (2):

$$\frac{d\hat{X}}{dt} = \hat{f}(X, t), \quad (1)$$

$$\frac{dP}{dt} = \left(E[X \cdot f^T] - \hat{X} \cdot \hat{f}^T\right) + \left(E[f \cdot X^T] - \hat{f} \cdot \hat{X}^T\right) + E[G \cdot \Lambda_x \cdot G^T], \quad (2)$$

in consideration of a first state function $\phi_1(X,t)$, a conditional expectation value $\hat{X}=E[(\phi_1(X,t)]$ of the first state function $\phi_1(X,t)$, a second state function $\phi_2(X,t)$, a conditional expectation value $P=E[\phi_2(X,t)]$ of the second state function $\phi_2(X,t)$ and an Itô equation (3):

$$\dot{X}(t)=f(X,t)+G(X,t)\cdot u(t) \quad (3)$$

that may include a first signal function $f(X,t)$, a first noise function $G(X,t)$, a white Gaussian noise function $u(t)$ and an expectation value $E[u(t)u^T(\tau)]=\Lambda_x\cdot\delta(t-\tau)$.

In an example, the at least one coupled differential equation may be based on a Fokker-Planck-Kolmogorov equation. Thus, the communication device may be configured to determine the conditional moments in consideration of a white Gaussian noise signal. The Fokker-Planck-Kolmogorov equation may be a forward Fokker-Planck-Kolmogorov equation (4):

$$\frac{d}{dt}p(X, t) = -\sum_{i=1}^{n}\frac{\partial(p(X, t)\cdot f_i(X, t))}{\partial X_i} + \frac{1}{2}\sum_{i,j=1}^{n}\frac{\partial^2(p(X, t)\cdot(G\Lambda_x G^T)_{ij})}{\partial X_i \partial X_j}, \quad (4)$$

that may be a solution of the Itô equation (3).

In an example, the Fokker-Planck-Kolmogorov equation may be continuous in time. Thus, a high oversampling rate of the received signal may be avoided by not discretizing the Fokker-Planck-Kolmogorov equation. Further, the communication device may be reliable and may have a low energy consumption.

In an example, the at least one conditional moment is a conditional average $\hat{X}(t)$. Thus, the correction circuit may be configured to determine the corrected interference estimation signal in a simple manner. Further, the signal that corresponds to the conditional average $\hat{X}(t)$ may be the corrected interference estimation signal. The conditional average $\hat{X}(t)$ may be a conditional expectation value $E[X(t)]=\int Z\cdot p[Z,t|C_1, C_2, \ldots, C_n]\,dZ$ of the interference signal random variable X(t).

In an example, the plurality of conditional moments includes a conditional variance or a conditional covariance P(t). Thus, the determination circuit and the correction circuit may be simple. The conditional covariance P(t) may be a conditional expectation value $E[\{X(t)-\hat{X}(t)\}\{X(t)-\hat{X}(t)\}_T]$ in consideration of the interference signal random variable X(t) and the conditional average $\hat{X}(t)$.

In an example, the determination circuit may be configured to determine an initial condition of the time evolution based on the interference signal model. Thus, no additional circuit may have to be provided to provide the determination circuit with an initial condition. Further, the communication device may be simple. In the example of a differential equation that includes the conditional average and a conditional variance, the initial condition of the conditional average may be a predefined first initial value $m_0$ and the initial condition of the conditional variance may be a predefined second initial value $P_0$.

In an example, the determination circuit may be configured to determine the at least one conditional moment based on a solution of the at least one coupled differential equation that may include an integral with respect to the time. Further, the determination circuit may be configured to integrate, in an example to approximate, the integral numerically. Moreover, the determination circuit may be configured to determine processing values of the numerical integration of the integral at a processing rate that may be higher than a sampling rate of the sample circuit. Thus, the communication device may be efficient and adaptable to sampling rate requirements of further components of the communication device in a flexible manner.

In an example, the sampling rate may correspond to the Nyquist frequency. Thus, the communication device may be energy efficient.

In an example, the correction circuit may be configured to determine at least one corrected conditional moment based on the at least one conditional moment and the signal sample. Moreover, the corrected interference estimation signal may include the at least one corrected conditional moment of the interference signal states. Thus, the correction circuit may be configured to determine an accurate corrected interference estimation signal.

In an example, the at least one corrected conditional moment may be a corrected conditional average that may be determined based on the conditional average and the signal sample.

In an example, the conditional moment may be an expectation value of a state function with respect to conditional state probabilities that are Bayesian probabilities of the interference signal states under a first condition based on the initial condition. Further, the at least one corrected conditional moment may be an expectation value of the state function with respect to corrected conditional state probabilities that are Bayesian probabilities of the interference signal states under the first condition and a second condition based on the signal sample. Thus, the communication device may be configured to determine a subtraction signal in an effective and efficient manner. The corrected conditional state probabilities may be Bayesian probabilities $p[X_l(t_l)|Y_l]$ in accordance with a formula (5) and (6):

$$p[X_l(t_l) \mid Y_l] = \frac{p[Y_l \mid X_l] \cdot p(X, t_l^-)}{\int p[Y_l \mid \xi] \cdot p(\xi, t_l^-) d\xi}, \tag{5}$$

$$p[Y_l \mid X_l] = \left((2 \cdot \pi)^{\frac{m}{2}} \cdot |\Lambda_x|^{\frac{1}{2}}\right)^{-1} \cdot$$

$$\exp\left[-\frac{1}{2} \cdot (Y(t_l) - h(X(t_l), t_l))^T \cdot \Lambda_x^{-1} \cdot (Y(t_l) - h(X(t_l), t_l))\right], \tag{6}$$

in consideration of a first integer l that may be one, prior probabilities $p(X,t_0^-)$ a measurement value $Y(t_1)$ of the signal sample, a second integer m that may be a dimension of the measurement value $Y(t_1)$, a second signal function $h(X(t_l),t_l)$, a white Gaussian noise value $v(t_1)$, a formula (7) that relates the measurement value $Y(t_1)$ with the interference signal states $X(t_l)$ at the time $t_l$, $$Y(t_l) = h(X(t_l),t_l) + v(t_l) \tag{7}$$

and a time $t_1^-$ that is a time an infinitesimal instant before the sampling time $t_1$. The measurement value $Y(t_1)$ may be a first condition $C_1$. Further, the Bayesian probabilities $p[X_l(t_l)|Y_l]$ may be conditional probability density functions, respectively. Moreover, the measurement value $Y(t_1)$ may be the signal sample of the received signal.

In an example, the at least one corrected conditional moment may be a plurality of corrected conditional moments that each are corrected conditional moments of the interference signal states. Further, the correction circuit may be configured to determine the corrected conditional moments of the plurality of corrected conditional moments based on the conditional moments of the plurality of conditional moments and the signal sample. Thus, the communication device may be configured to subtract an interference signal from the received signal in a reliable and effective manner.

In an example, the interference estimation signal may be a first iteration determination signal, the plurality of conditional moments may be a plurality of first iteration moments, the plurality of conditional moment functions may be a plurality of first iteration moment functions, the corrected interference estimation signal may be a first corrected interference estimation signal, the plurality of corrected conditional moments may be a plurality of first corrected iteration moments and the signal sample may be a first signal sample. Further, the correction circuit may be configured to determine a first iteration correction signal that includes the plurality of first corrected iteration moments. Moreover, the sample circuit may be configured to sample a second signal sample of the received signal. The determination circuit may be configured to determine a plurality of second iteration moments of the interference signal states that are associated with a second sampling time of the second signal sample based on a second time evolution of second iteration moment functions that if evaluated at the second sampling time are the second iteration moments, respectively, and on the first corrected iteration moments as an initial condition of the time evolution of the second iteration moment functions. Further, the determination circuit may be configured to determine a second iteration determination signal that includes the second iteration moments. The correction circuit may be configured to determine a plurality of second corrected iteration moments of the interference signal states based on the second iteration moments and the second signal sample. Moreover, the correction circuit may be configured to determine a second corrected interference estimation signal that includes at least a single second corrected iteration moment of the second corrected iteration moments. Further, the subtraction circuit may be configured to subtract the second corrected interference estimation signal from the received signal. Thus, the communication device may be configured to determine a reliable interference estimation signal so that the interference signal may be subtracted from the received signal in an effective and reliable manner. The example may exemplify an iteration of iteration processes.

In an example, the second corrected iteration moments may be initial conditions of the determination circuit. The determination circuit may configured to determine third iteration moments and the correction circuit may be configured to determine third corrected iteration moments based on the third iteration moments.

In an example, the second time evolution may be based on the Fokker-Planck-Kolmogorov equation. Further, the second time evolution may include the second iteration moments of the plurality of second iteration moment functions.

In an example, the interference signal model is one of a group of interference signal models consisting of a stochastic Markov process model and a chaotic model. Thus, the communication device may be flexibly adapted to the statistics of the interference signal.

In an example, the determination circuit may be configured to determine at least one of the conditional moment, the first iteration moment, the second iteration moment or the third iteration moment based on a nonlinear filtering algorithm that is a filtering algorithm of a group of filtering algorithms consisting of an Extended Kalman Filter, a second-order Extended Kalman Filter, an Iterated Kalman Filter, a Quadrature Kalman Filter and an Unscented Kalman Filter.

In an example, the correction circuit may be configured to determine at least one of the corrected conditional moment, the first corrected iteration moment, the second corrected iteration moment or the third corrected iteration moment based on a nonlinear filtering algorithm that is a filtering algorithm of a group of filtering algorithms consisting of an Extended Kalman Filter, a second-order Extended Kalman Filter, an Iterated Kalman Filter, a Quadrature Kalman Filter and an Unscented Kalman Filter.

In an example, the numerical integration may be a numerical integration of a numerical integration scheme that is one of a group of numerical integration schemes consisting of Runge Kutta, Heun and Euler.

In an example, the determination circuit and the correction circuit are configured to determine the interference estimation signal and the corrected interference estimation signal, respectively, based on a nonlinear filtering algorithm of a group of filtering algorithms consisting of an Extended Kalman Filter, a second-order Extended Kalman Filter, an Iterated Kalman Filter, a Quadrature Kalman Filter and an Unscented Kalman Filter.

In an example, a communication device is provided including a receiver configured to receive a signal that may include a first signal and a second signal. Further, the communication device may include a first determination circuit configured to determine a first interference estimation signal of the first signal based on an interference signal model. Moreover, the communication device may include a first correction circuit configured to determine a first corrected interference estimation signal based on the first interference estimation signal and on a first signal sample based on the first signal. Further, the communication device may include a second determination circuit configured to determine a second interference estimation signal of the first signal based on the first corrected interference estimation signal and on the interference signal model. Moreover, the communication device may include a second correction circuit configured to determine a second corrected interference estimation signal of the first signal based on the second interference estimation signal and on a second signal sample based on the second signal. Further, the communication device may include a subtraction circuit configured to subtract the second corrected interference estimation signal from the first signal. Thus, the communication device may be configured to determine an output signal that reliably excludes an interference signal. The output signal may be a subtraction signal that is the subtraction of the second corrected interference estimation signal from the first signal. Further, the output signal may include an information signal and a white Gaussian noise signal.

In an example, the communication device may include a sample circuit configured to sample the first signal sample of the first signal and the second signal sample of the second signal. Thus, the communication device may be configured to determine a reliable interference estimation signal. Further, a Gaussian noise signal included in the subtraction signal may only have weakly correlated statistics.

In an example, the first signal sample may be sampled at a first sampling time and the second signal sample may be sampled at a second sampling time. Further, the first determination circuit may be configured to determine the first interference estimation signal based on first interference signal states of a plurality of first interference signal states of the interference signal model. The first determination circuit may be configured to determine at least one first conditional moment of the first interference signal states that may be associated with the first sampling time based on a first time evolution of at least one time dependent first conditional moment function. The first conditional moment function may be associated with the interference signal model and may be the at least one first conditional moment if evaluated at the first sampling time. The first interference estimation signal may include the at least one first conditional moment of the first interference signal. Further, the first correction circuit may be configured to determine at least one first corrected conditional moment that is associated with the first sampling time based on the at least one first conditional moment and the first signal sample. The first corrected interference estimation signal may include the at least one first corrected conditional moment of the first interference signal states. Moreover, the second determination circuit may be configured to determine the second interference estimation signal based on second interference signal states of a plurality of second interference signal states of the interference signal model. The second determination circuit may be configured to determine at least one second conditional moment of the second interference signal states that may be associated with the second sampling time based on the at least one first corrected conditional moment and a second time evolution of at least one time dependent second conditional moment function. The second conditional moment function may be associated with the interference signal model and may be the at least one second conditional moment if evaluated at the second sampling time. The second interference estimation signal may include the at least one second conditional moment. Thus, the communication device may be configured to exclude the interference signal in a reliable and effective manner.

In an example, the at least one first conditional moment may be a plurality of first conditional moments that are associated with the first sampling time. Further, the at least one time dependent first conditional moment function may be a plurality of time dependent first conditional moment functions that are associated with the interference signal model and are the first conditional moments if evaluated at the first sampling time, respectively. Moreover, the first time evolution of the plurality of time dependent first conditional moment functions may be a time evolution in accordance with at least one coupled differential equation that includes the first conditional moment functions of the plurality of time dependent first conditional moment functions. Further, the at least one second conditional moment may be a plurality of second conditional moments that are associated with the second sampling time. The at least one time dependent second conditional moment function may be a plurality of time dependent second conditional moment functions that are associated with the interference signal model and are the second conditional moments if evaluated at the second sampling time, respectively. Further, the second time evolution of the plurality of time dependent second conditional moment functions may be a time evolution in accordance with at least one coupled differential equation that may include the second conditional moment functions of the plurality of time dependent second conditional moment functions. Thus, the communication device may be configured to exclude the interference signal from the received signal in a reliable and effective manner.

In an example, the coupled differential equation may be based on the Fokker-Planck-Kolmogorov equation. The Fokker-Planck-Kolmogorov equation may be continuous in time.

In an example, the at least one first conditional moment function and the at least one second conditional moment function may be conditional averages. Thus, the communication device may be simple. Further, the communication device may be configured to determine the second corrected interference estimation signal in a simple manner based on the conditional average.

In an example, the plurality of first conditional moments and the plurality of second conditional moments may include a conditional variance or a conditional covariance, respectively. Thus, the communication device may be reliable and simple.

In an example, the communication device may be configured to determine an initial condition of the first time evolution based on the interference signal model. The initial condition may include a predefined value or a measurement value based on the received signal.

In an example, the first determination circuit may be configured to determine the at least one first conditional moment based on a first solution of the Fokker-Planck-Kolmogorov equation that includes a first integral with respect to the time. Further, the first determination circuit may be configured to integrate the first integral numerically. Moreover, the first determination circuit may be configured to determine processing values of the numerical integration of the first integral at a processing rate that is higher than a sampling rate at which the first signal sample and the second signal sample are sampled. The second determination circuit may be configured to determine the at least one second conditional moment based on a second solution of the Fokker-Planck-Kolmogorov equation that may include a second integral with respect to the time. The second determination circuit may be configured to integrate the second integral numerically. Further, the second determination circuit may be configured to determine processing values of the second numerical integration at the processing rate. Thus, the communication device may be energy-efficient and may avoid high over sampling rate.

In an example, the sampling rate may correspond to the Nyquist frequency.

In an example, the at least one first conditional moment may be an expectation value of a state function with respect to first conditional state probabilities that are Bayesian probabilities of the first interference signal states under a first condition based on the initial condition. The at least one first corrected conditional moment may be an expectation value of the state function with respect to first corrected conditional state probabilities that are probabilities of the first interference signal states under the first condition and a second condition based on the second signal sample. Further, the at least one second conditional moment may be an expectation value of the state function with respect to second conditional state probabilities that are Bayesian probabilities of the second interference signal states under the first condition and the second condition. Moreover, the at least one second corrected conditional moment may be an expectation value of the state function with respect to second corrected conditional state probabilities that are probabilities of the second interference signal states under the first condition, the second condition and a third condition based on the second signal sample. Further, the at least one second corrected conditional moment may be associated with the second sampling time. Further, the at least one second corrected interference estimation signal may include the second corrected conditional moment. Thus, the communication device may be configured to exclude the interference signal from the received signal in a reliable and effective manner.

In an example, the at least one first corrected conditional moment may be a plurality of first corrected conditional moments that each are first corrected conditional moments of the interference signal states. Further, the first correction circuit may be configured to determine the first corrected conditional moments of the plurality of first corrected conditional moments based on the first conditional moments of the plurality of first conditional moments and the first signal sample. Moreover, the at least one first corrected conditional moment may be a plurality of first corrected conditional moments that each are first corrected conditional moments of the interference signal states. Further, the second correction circuit may be configured to determine the second corrected conditional moments of the plurality of second corrected conditional moments based on the second conditional moments of the plurality of second conditional moments and the second signal sample. Thus, the communication device may be configured to effectively subtract the interference signal from the received signal.

In an example, the received signal may be a baseband signal.

In an example, the communication device may include a model selection circuit configured to select a first interference signal model from a plurality of predefined interference signal models based on at least a first statistical property of the received signal that is different from a white Gaussian noise signal. Further, the interference signal model may be the first interference signal model. Thus, the communication device may be very effective in the subtraction of the interference signal from the received signal.

In an example, the interference signal model may include at least one predetermined function that is a function of at least one of the interference signal states or the time. Further, the determination of at least one of the conditional moment, the first conditional moment, the second conditional moment, the corrected conditional moment, the first corrected conditional moment or the second corrected conditional moment may include at least one output value of the at least one predetermined function. Moreover, the communication device may further include an evaluation circuit configured to determine the at least one output value of the at least one predetermined function and to transmit the at least one output value to the determination circuit and the correction circuit. Further, the determination circuit may be configured to determine the conditional moment, the first conditional moment or the second conditional moment based on the at least one output value of the at least one predetermined function. Moreover, the correction circuit may be configured to determine the corrected conditional moment, the first corrected conditional moment or the second corrected conditional moment based on the at least one output value of the at least one predetermined function. Thus, the communication device may be adapted in a flexible and simple manner to various interference signal models.

In an example, the communication device may be configured in accordance with a communication standard of a group of communication standards consisting of WiFi, Long Term Evolution (LTE) and Long Term Evolution Advanced (LIE-Advanced).

Furthermore, a method for signal determination in radio communication is provided that may include receiving a signal. Further, the method may include determining an interference estimation signal of the received signal based on an interference signal model. Moreover, the method may include determining a corrected interference estimation signal based on the determined interference estimation signal and on a signal sample based on the received signal. Further, the method may include subtracting the corrected interference estimation signal from the received signal. Thus, an output signal that excludes an interference signal may be determined in a reliable and efficient manner. The output signal may be a subtraction signal that is the subtraction of the corrected interference estimation signal from the received signal. Further, the output signal may include an information signal and a white Gaussian noise signal.

Furthermore, a method for signal determination in radio communication is provided that may include receiving a signal that comprises a first signal and a second signal. Further, the method may include determining a first interference estimation signal of the first signal based on an interference signal model. Moreover, the method may include determining a first corrected interference estimation signal based on the first interference estimation signal and on a first signal sample based on the first signal. Further, the method may include determining a second interference estimation signal of the first signal based on the first corrected interference estimation signal and on the interference signal model. Moreover, the method may include determining a second corrected interference estimation signal of the first signal based on the second interference estimation signal and on a second signal sample based on the second signal. Further, the method may include subtracting the second corrected interference estimation signal from the first signal. Thus, an output signal may be determined that excludes an interference signal in a reliable and effective manner. The output signal may be a subtraction signal that is the subtraction of the second corrected interference estimation signal from the first signal. Further, the output signal may include an information signal and a white Gaussian noise signal.

It should be noted that aspects described in the context of the previous examples may be analogously valid for the above provided methods.

FIG. 1 shows a schematic diagram of a mobile radio communication system 100 based on the Long Term Evolution (LTE) communication standard, a first wireless mobile device 102 according to an example and a second wireless mobile device 103. The mobile radio communication system 100 may have a core network 104 and a radio access network 106 that includes several LTE base stations from which a first base station 108 of a first cell 109, a second base station 110 of a second cell 111 and a third base station 112 of a third cell 113 are shown. The base stations 108, 110, 112 may be connected with each other and with the core network 104, respectively. Further, the first base station 108 may transmit a first signal 114 to the first wireless mobile device 102 and the second base station 110 may transmit a second signal 116 to the second wireless mobile device 103. The first wireless mobile device 102 may be configured to receive a radio frequency signal including a superposition of the first signal 114, the second signal 116 and a white noise signal. The first signal 114 may be referenced as information signal. The second signal 116 may be referenced as interference signal.

Figure 2:
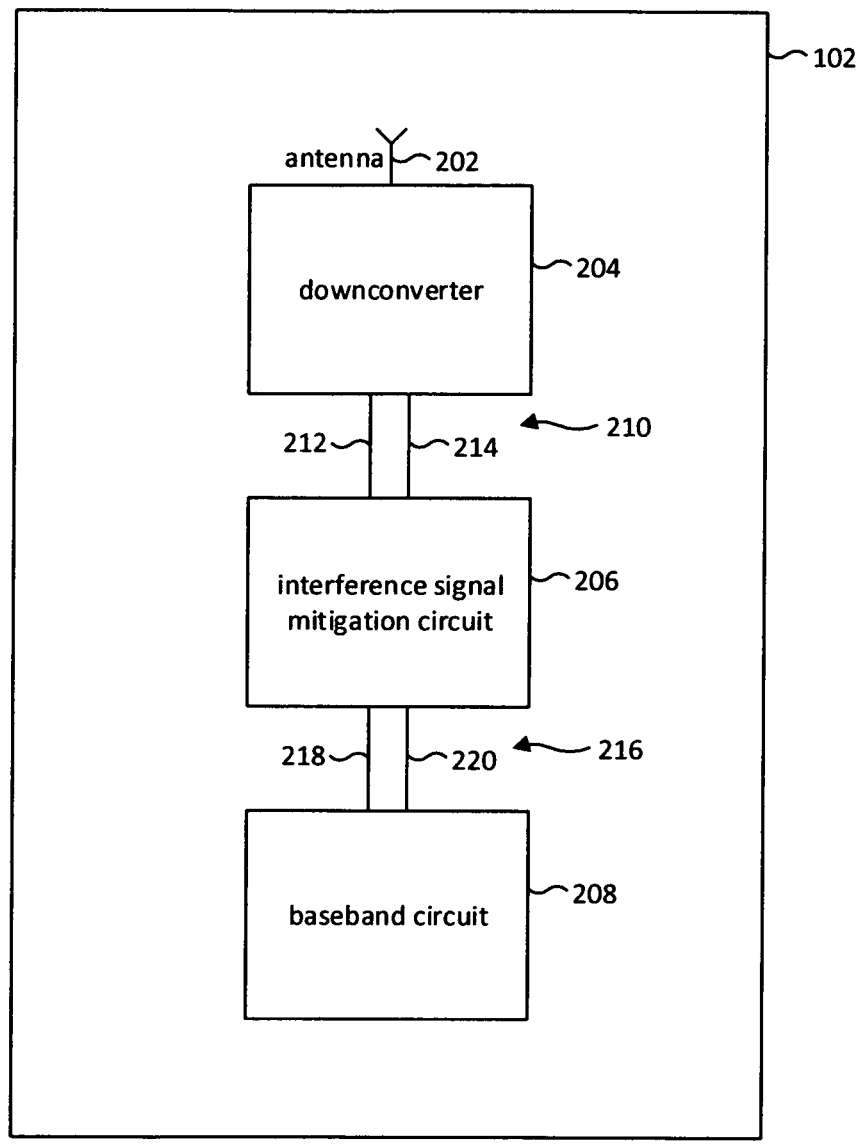
FIG. 2 shows a schematic drawing of the first wireless mobile device.

FIG. 2 shows a schematic drawing of the first wireless mobile device 102. The first wireless mobile device 102 may include an antenna 202, a downconverter 204, an interference signal mitigation circuit 206 and a baseband circuit 208. The antenna 202 may be configured to receive the radio frequency signal and to transmit the received radio frequency signal to the downconverter 204. The downconverter 204 may be configured to convert the received radio frequency signal to a digitized complex baseband signal that may be amplified with respect to the received radio frequency signal. Further, the downconverter 204 may be connected to the interference signal mitigation circuit 206 via a first connection 210 that may include a first data line 212 and a second data line 214. The interference signal mitigation circuit 206 may be connected to the baseband circuit 208 via a second connection 216 that may include a third data line 218 and a fourth data line 220.

Figure 3:
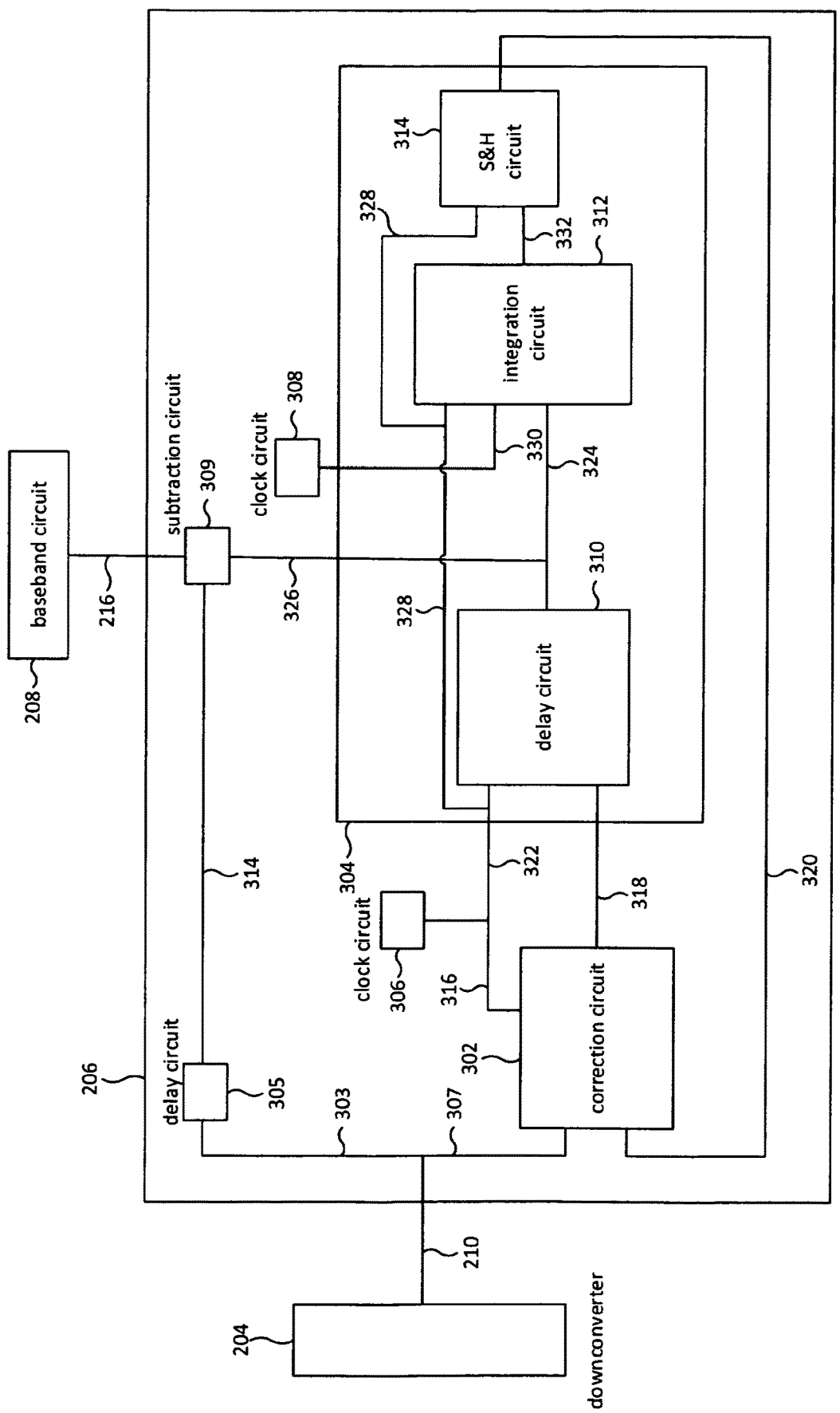
FIG. 3 shows a schematic drawing of a mitigation circuit, a downconverter and a baseband circuit of the first wireless mobile device.

FIG. 3 shows a schematic drawing of the mitigation circuit 206, the downconverter 204 and the baseband circuit 208. The mitigation circuit 206 may include a correction circuit 302, a determination circuit 304, a first delay circuit 305, a first clock circuit 306, a second clock circuit 308 and a subtraction circuit 309. The determination circuit 304 may include a second delay circuit 310, an integration circuit 312 and a sample and hold circuit 314.

Further, the downconverter 204 may be connected with the first delay circuit 305 via the first connection 210 and a third connection 303 and with the correction circuit 302 via the first connection 210 and a fourth connection 307. The first delay circuit 305 may be connected with the subtraction circuit 309 via a fifth connection 314. The subtraction circuit 309 may be connected with the baseband circuit 208 via the second connection 216.

Moreover, the correction circuit 302 may be connected with the first clock circuit 306, the second delay circuit 310 and the sample and hold circuit 314 via a sixth connection 316, a seventh connection 318 and an eighth connection 320, respectively.

The second delay circuit 310 may be connected with the first clock circuit 306, the integration circuit 312 and the subtraction circuit 309 via a ninth connection 322, a tenth connection 324 and an eleventh connection 326, respectively.

The integration circuit 312 may be connected with the first clock circuit 306, the second clock circuit 308 and the sample and hold circuit 314 via a twelfth connection 328, a thirteenth connection 330 and a fourteenth connection 332, respectively.

The first clock circuit 306 may be configured to transmit a first clock signal that periodically indicates first processing time intervals $T_d$ that correspond to sampling time intervals of the downconverter 204, respectively. Further, the second clock circuit 308 may be configured to transmit a second clock signal that periodically indicates second process time intervals $T_c$. The second clock signal may indicate second processing time intervals $T_c$ that are smaller than the first processing time intervals $T_d$, respectively. The second processing time intervals $T_c$ may be predefined in consideration of the first processing time intervals $T_d$ and a natural number N by a formula (8):

$$T_c = \frac{T_d}{N}. \tag{8}$$

Further, in an initialization phase of the mitigation circuit 206, the determination circuit 304 may be configured to provide device configuration initial conditions to the integration circuit 312. Further, the integration circuit 312 may be configured to receive a first device configuration initial condition $X(t_0)$ of the device configuration initial conditions and a second device configuration initial condition $P(t_0)$ of the device configuration initial conditions and to determine a first initial conditional mean state value $\hat{X}[t_0|t_0]$ by a formula (9):

$$\hat{X}[t_0|t_0] = X(t_0), \tag{9}$$

and a first initial conditional error covariance value $P[t_0|t_0]$ by a formula (10):

$$P[t_0|t_0] = P(t_0). \tag{10}$$

The initial condition mean state value $\hat{X}[t_0|t_0]$ may be a mean value of an initial condition state $X[t_0|t_0]$. In case of a one dimensional initial condition state $X[t_0|t_0]$, the initial condition state $X[t_0|t_0]$ may be a predefined Gaussian distribution that may have the first device configuration initial condition $X(t_0)$ as a mean value and the second device configuration initial condition $P(t_0)$ as a variance. The mean value of the predefined Gaussian distribution may be predefined to be a number, for example 1. $P(t_0)$ may be predefined to be a zero matrix.

In a determination phase of the mitigation circuit 206, the integration circuit 312 may be configured to receive the first clock signal and the second clock signal and to determine a first conditional mean state value $\hat{X}[t_1|t_0]$ and a first conditional error covariance value $P[t_1|t_0]$ based on a statistical radio interference model, the first initial conditional mean state value $\hat{X}[t_0|t_0]$ and the first initial conditional error covariance value $P[t_0|t_0]$ in consideration of the first clock signal and the second clock signal. The determination of the first conditional mean state value $\hat{X}[t_1|t_0]$ and the first conditional error covariance value $P[t_1|t_0]$ based on the first initial conditional mean state value $\hat{X}[t_0|t_0]$ and the first initial conditional error covariance value $P[t_0|t_0]$ may be the beginning of a first iteration process of an iteration. Further, the integration circuit 312 may be configured to determine a first output signal including the first conditional mean state value $\hat{X}[t_1|t_0]$ and the first conditional error covariance value $P[t_1|t_0]$ and to transmit the first output signal to the sample and hold circuit 314.

The sample and hold circuit 314 may be configured to receive the first clock signal and to determine a signal sample of the first output signal of the integration circuit 312 based on the first clock signal. Further, the sample and hold circuit 314 may be configured to transmit the signal sample to the correction circuit 302.

Moreover, the downconverter 204 may be configured to sample a first measurement value $Y_1$ of the baseband signal at a second sampling time $t_1$ and to transmit a second converted signal including the first measurement value $Y_1$ to the correction circuit 302 and to the first delay circuit 305. The first measurement value $Y_1$ may be related to an interference signal state $X(t_1)$ at the second sampling time $t_1$, a white Gaussian noise function $v(t_1)$ and a first measurement function value $h(X(t_1),t_1)$ of a measurement function $h(X(t),t)$ by a formula (11):

$$Y_1 = h(X(t_1), t_1) + v(t_1). \tag{11}$$

The correction circuit 302 may be configured to determine a first corrected conditional mean state value $\hat{X}[t_1|t_1]$ and a first corrected conditional error covariance value $P[t_1|t_1]$ based on the signal sample received from the sample and hold circuit 314 and on the first measurement value $Y_1$. Moreover, correction circuit 302 may be configured to determine a first subtraction sample $h(\hat{X}[t_1|t_1],t_1)$ based on the measurement function $h(X(t),t)$ and the first corrected conditional mean state value $\hat{X}[t_1|t_1]$ and to determine a second output signal including the first corrected conditional mean state value $\hat{X}[t_1|t_1]$, the first corrected conditional error covariance value $P[t_1|t_1]$ and the first subtraction sample $h(\hat{X}[t_1|t_1],t_1)$ and to transmit the second output signal to the second delay circuit 310.

The second delay circuit 310 may be configured to transmit the received second output signal of the correction circuit 302 to the subtraction circuit 309 and to the integration circuit 312 after a delay that is determined based on the first clock signal.

Further, the first delay circuit 305 may be configured to transmit the second converted signal of the downconverter 204 to the subtraction circuit 309 after a delay that is predetermined in such a way that the subtraction circuit 309 may receive the second converted signal and the second output signal of the correction circuit 302 that is transmitted by the first delay circuit 310 at the same time.

The subtraction circuit 309 may be configured to determine a first output signal that may be a subtraction of a signal corresponding to the first subtraction sample $h(X[t_1|t_1],t_1)$ from the received second converted signal. Further, the subtraction circuit 309 may be configured to transmit the first output signal of the subtraction circuit 309 to the baseband circuit 208. A subtraction of the received second output signal of the correction circuit 302 from the received second converted signal by the subtraction circuit 309 may be the end of the first iteration process.

Moreover, the integration circuit 312 may be configured to receive the second output signal of the correction circuit 302 transmitted by the second delay circuit 310 and to determine a second conditional mean state value $\hat{X}[t_2|t_1]$ and a second conditional error covariance value $P[t_2|t_1]$ based on the received second output signal, the interference signal model and in consideration of the first clock signal and the second clock signal. The determination of the second output signal of the integration circuit 312 may the beginning of a second iteration process of the iteration.

Figure 4:
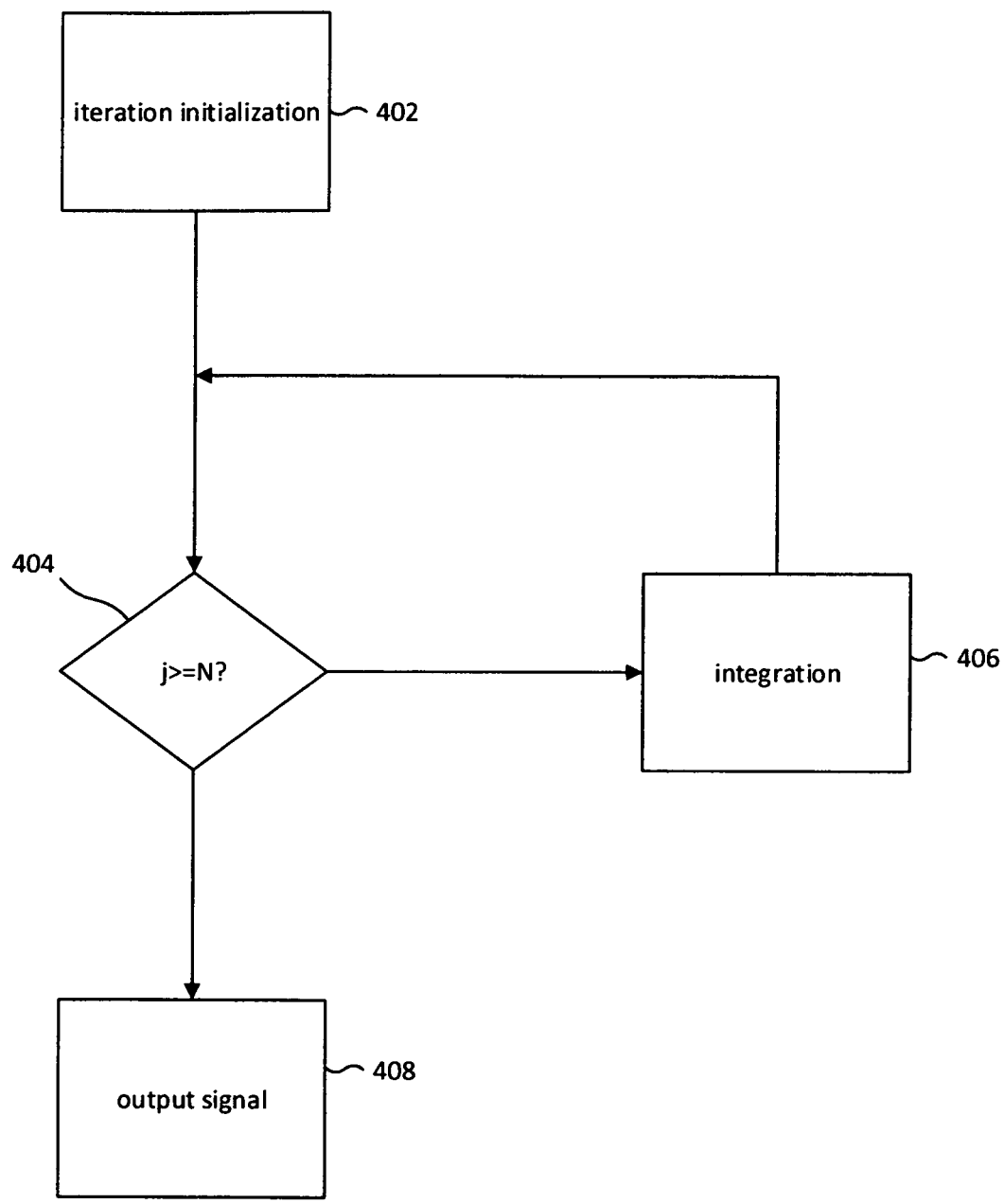
FIG. 4 shows a flow diagram that the integration circuit of the first wireless mobile device may be configured to execute.

FIG. 4 shows a flow diagram that the integration circuit 312 may be configured to execute to determine an output signal of a plurality of output signals that may be associated with a first iteration index value k of the iteration index in consideration of a first interference signal model and the Extended Kalman Filter as a nonlinear filtering algorithm. The first interference signal model may be at least one of a stochastic Markov process model or a chaotic model. The first iteration index value k may be a nonnegative natural number.

The determination of the output signal that is associated with the first iteration index value k may be based in consideration of a sampling time $t_k$, a time t that fulfills $t \geq t_k$, an interference signal state random variable $X(t)$ at the time t which may also be referenced by X, a first signal function $f(X,t)$, a first noise function $G(X,t)$, a white Gaussian noise function $u(t)$, the first initial conditional mean state value $\hat{X}[t_0|t_0]$, the first initial conditional error covariance value $P[t_0|t_0]$, measurement values $Y(t_1), \ldots, Y(t_k)$, white Gaussian noise values $v(t_1), \ldots, v(t_k)$, indices i that may be $1, \ldots, k$, and the measurement function values $h(X(t_1), t_1), \ldots, h(X(t_k),t_k)$ on a formula (12) and a formula (13):

$$\dot{X}(t) = f(X,t) + G(X,t) \cdot u(t), \tag{12}$$

$$Y(t_i) = h(X(t_i), t_i) + v(t_i). \tag{13}$$

An interference signal random variable $X(t_{k+1})$ at the time $t_{k+1}$ may be a random variable that may be the interference signal state value $X_{k+1}$ with a conditional probability $p[X_{k+1}|Y_k,t_{k+1}]$ under the condition of the measurement values $Y(t_1), \ldots, Y(t_k)$. The measurement values $Y(t_1), \ldots, Y(t_k)$ may be referenced by $Y_1, \ldots, Y_k$, respectively.

Moreover, the white Gaussian noise function $u(t)$ at time t may be a random variable that may be related to the transpose of the white Gaussian noise function $u^T(T)$ at time T by a formula (14) in consideration of an expectation operator $E[\cdot]$ that determines an expectation value and a first function of the time $\Lambda_x$:

$$E[u(t) \cdot u^T(T)] = \Lambda_x \cdot \delta(t-\tau). \tag{14}$$

The white Gaussian noise values $v(t_1), \ldots, v(t_k)$ may be random variables that are related to each other by a formula (15) in consideration of integers n and l that are smaller or equal to the first iteration index value k, a Kronecker delta $\delta_{n,l}$ and a second function $\Lambda_y(t)$ of the time evaluated at the sampling time $t_n$:

$$E[v(t_n) \cdot v^T(\tau_l)] = \Lambda_y(t_n) \cdot \delta_{n,l}. \tag{15}$$

Further, a (k+1)-th conditional mean state value $X(t_{k+1})$ may be an expectation value $E[X(t_{k+1})]$ of the interference signal state $X(t_{k+1})$ with respect to the conditional probabilities p[ ] and may be referenced by $\hat{X}[t_{k+1}|t_k]$.

Further, the integration circuit 312 may be configured to determine a conditional error covariance value P(t) that may be the expectation value of a formula (16):

$$P(\hat{X},t)=E[\{X(t)-\hat{X}(t)\}\cdot\{X(t)-\hat{X}(t)\}^T], \quad (16)$$

by a formula (17):

$$\dot{P}(t)=R(P(\hat{X},t),t) \quad (17)$$

in consideration of a covariance operator function $\hat{X}(P(X,t),t)$ that the integration circuit 312 may be configured to determine by a formula (18):

$$R(P(\hat{X},t),t)=F(\hat{X}(t))\cdot P(\hat{X},t)+P(\hat{X},t)\cdot F^T(\hat{X}(t))+G\cdot\Lambda_x\cdot G^T, \quad (18)$$

and in consideration of a first derivative function F evaluated at $\hat{X}(t)$ which the integration circuit 312 may be configured to determine by a formula (19):

$$F(\hat{X}(t)) = \frac{\partial f(x,t)}{\partial x}\bigg|_{\hat{X}(t)}. \quad (19)$$

In case of the first iteration process, the integration circuit 312 may, in 402, be configured to start a first determination iteration in consideration of the iteration index that may have the iteration index value 0, a second integer j that may be 1, a first processing time variable $t_{0,0}$ that may be $t_0$, the first initial conditional mean state value $\hat{X}[t_0|t_0]$ and the first initial conditional error covariance value $P[t_0|t_0]$.

If the first iteration index value k is greater than 0 a next iteration process of the iteration may be associated with the first iteration index value k. In the next iteration process the integration circuit 312 may be configured to determine a (k+1)-th initial conditional mean state value $\hat{X}[t_k|t_k]$ and a (k+1)-th initial conditional error covariance value $P[t_k|t_k]$ in a previous iteration process of the iteration that is associated with an iteration index value k-1. The integration circuit 312 may, in 402, be configured to start a determination iteration associated with the first iteration index value k in consideration of the second integer j that may be 1, the first processing time variable $t_{k+1,0}$ that may be $t_k$ and a first processing mean state value $\hat{X}_{k+1,1}$ that may be the (k+1)-th initial conditional mean state value $\hat{X}[t_k|t_k]$ and a first processing error covariance value $P_{k+1,1}$ that may be the (k+1)-th initial conditional error covariance value $P[t_k|t_k]$.

The integration circuit 312 may, in 404, be configured to compare j with the natural number N. If j is not greater than the natural number N then the integration circuit 312 may be configured to execute operations of 406.

The integration circuit 312 may, in 406, be configured to determine a processing mean state value $\hat{X}_{k+1,j}$ of a plurality of processing mean state values $\hat{X}_{k+1,1}, \ldots, \hat{X}_{k+1,N}$ in consideration of the first derivative function F evaluated at $X_{k+1,j-1}$ a processing time step $\Delta t$ that may be determined by a formula (20):

$$\Delta t = \frac{T_d}{N}, \quad (20)$$

a second processing time variable $t_{k+1,j}$ that may be determined by a formula (21):

$$t_{k+1,j}=t_{k+1,j-1}+\Delta t \quad (21)$$

and an operator $O_i^{\Delta t}$ acting on a function $f$ evaluated at $\hat{X}_{k+1,j-1}$ and $t_{k+1,j-1}$ that may be referenced by $(O_i^{\Delta t} f)(\hat{X}_{k+1,j-1},t_{k+1,j-1})$ by a formula (22):

$$\hat{X}_{k+1,j}=\hat{X}_{k+1,j-1}+(O_i^{\Delta t}f)(\hat{X}_{k+1,j-1},t_{k+1,j-1}). \quad (22)$$

The operator $O_i^{\Delta t}$ may be an operator that determines an approximation of an integration of the function $f$ over the integration range $\Delta t$. For example the operator $O_i^{\Delta t}$ may be a Runge-Kutta-operator of the order i.

The Runge-Kutta-operator $O_i^{\Delta t}$ of the order 1 may be an Euler operator that the integration circuit 312 may be configured to determine by a formula (23):

$$(O_i^{\Delta t}f)(X,t)=\Delta t\cdot f(X,t). \quad (23)$$

Alternatively, the Runge-Kutta-operator $O_i^{\Delta t}$ of the order 2 may be a Heun operator that the integration circuit 312 may be configured to determine in consideration of a formula (24):

$$K_1=f(X,t) \quad (24)$$

and a formula (25):

$$K_2=f(X+\Delta t\cdot K_1,t+\Delta t), \quad (25)$$

by a formula (26):

$$(O_2^{\Delta t}f)(X,t) = \frac{\Delta t}{2}\cdot[K_1+K_2]. \quad (26)$$

Alternatively, the Runge-Kutta-operator $O_i^{\Delta t}$ of the order 4 may be a fourth order operator that the integration circuit 312 may be configured to determine in consideration of the formula (24), the formula (25), a formula (27):

$$K_3 = f\left(X + \frac{\Delta t}{2}\cdot K_2, t + \frac{\Delta t}{2}\right) \quad (27)$$

and a formula (28):

$$K_4=f(X+\Delta t\cdot K_3,t) \quad (28)$$

by a formula (29):

$$(O_4^{\Delta t}f)(X,t) = \frac{\Delta t}{6}\cdot[K_1+2\cdot K_2+2\cdot K_3+K_4]. \quad (29)$$

Instead of the Runge-Kutta-operator of the order i the integration circuit 312 may be configured to use other means of approximation of the integration of the function $f$ over the integration range $\Delta t$.

Further, the integration circuit 312 may be configured to determine an processing error covariance value $P_{k+1,j}$ of a plurality of processing error covariance values $P_{k+1,1}, \ldots, P_{k+1,N}$ in consideration of the covariance operator function $R(P(F(\hat{X}_{k+1,j-1}),t_{k+1,j-1})$ by a formula (30):

$$P_{k+1,j}=P_{k+1,j-1}+(O_i^{\Delta t}R)(P_{k+1,j-1}(F(\hat{X}_{k+1,j-1}),t_{k+1,j-1}), t_{k+1,j-1}). \quad (30)$$

Moreover, the integration circuit 312 may be configured to assign a new value $j_{new}$ to the second integer j by a formula (31):

$$j_{new}=j+1. \quad (31)$$

Further, if j is greater than the natural number N in the comparison of 404 the integration circuit 312 may be configured to execute operations of 408.

Moreover, the integration circuit 312 may, in 408, be configured to determine the output signal that corresponds to the next iteration process associated with the first iteration index value k as a signal including the (k+1)-th conditional mean state value $\hat{X}[t_{k+1}|t_k]$ that may be a processing mean state value $\hat{X}_{k+1,N}$ of the plurality of processing mean state values $\hat{X}_{k+1,1}, \ldots, \hat{X}_{k+1,N}$ and a (k+1)-th conditional error covariance value $P[t_{k+1}|t_k]$ that may be a processing error covariance value $P_{k+1,N}$ of the plurality of processing error covariance values $P_{k+1,1}, \ldots, P_{k+1,N}$. Moreover, the time $t_{k+1}$ may be the last processing time variable $t_{k+1,N}$ in the determination iteration.

Further, the downconverter 204 may be configured to transmit a (k+1)-th measurement value $Y(t_{k+1})$ to the first delay circuit 305 and to the correction circuit 302 in consideration of a (k+1)-th value $\Lambda_y(t_{k+1})$ of the second function $\Lambda_y(t)$ and a (k+1)-th white Gaussian noise value $v(t_{k+1})$ that may be related to the white Gaussian noise value $v(t_j)$ by a formula (32):

$$E[v(t_{k+1}) \cdot v^T(\tau_j)] = \Lambda_y(t_{k+1}) \cdot \delta_{k+1,j}. \tag{32}$$

The (k+1)-th measurement value $Y(t_{k+1})$ may be related to the interference signal state $X(t_{k+1})$ by a formula (33):

$$Y(t_{k+1}) = h(X(t_{k+1}), t_{k+1}) + v(t_{k+1}). \tag{33}$$

Further, the correction circuit 302 may be configured to determine a (k+1)-th corrected conditional mean state value $\hat{X}[t_{k+1}|t_{k+1}]$ and a (k+1)-th corrected conditional error covariance value $P[t_{k+1}|t_{k+1}]$ by formulas (34) and (35), respectively:

$$\hat{X}[t_{k+1}|t_{k+1}] = \hat{X}[t_{k+1}|t_k] + K(t_{k+1}) \cdot \{Y(t_{k+1}) - H(t_{k+1}) \cdot \hat{X}[t_{k+1}|t_k]\}, \tag{34}$$

$$P[t_{k+1}|t_{k+1}] = [I - K(t_{k+1}) \cdot H(t_{k+1})] \cdot P[t_{k+1}|t_k] \cdot [I - K(t_{k+1}) \cdot H(t_{k+1})]^T + K(t_{k+1}) \cdot \Lambda_y(t_{k+1}) \cdot K^T(t_{k+1}) \tag{35}$$

in consideration of the (k+1)-th measurement value $Y(t_{k+1})$, a first derivative function value $H(t_{k+1})$ of a second derivative function $H(t)$ that the correction circuit 302 may be configured to determine by a formula (36):

$$H(t_{k+1}) = \left. \frac{\partial h(x, t)}{\partial x} \right|_{\hat{X}[t_{k+1}|t_k]}, \tag{36}$$

a processing mean state value $\hat{X}[t_{k+1}|t_k]$ of the plurality of processing mean state values $\hat{X}_{k+1,1}, \ldots, \hat{X}_{k+1,N}$ and a processing error covariance value $P[t_{k+1}|t_k]$ of the plurality of processing error covariance values $P_{k+1,1}, \ldots, P_{k+1,N}$, a transpose multidimensional function $(\cdot)^T$ of a multidimensional function $(\cdot)$, a unit matrix I and a function value $K(t_{k+1})$ that the correction circuit 302 may be configured to determine in consideration of an inverse matrix $\{\cdot\}^{-1}$ of a matrix $\{\cdot\}$ by a formula (37):

$$K(t_{k+1}) = P[t_{k+1}|t_k] \cdot H^T(t_{k+1}) \cdot \{H(t_{k+1}) \cdot P[t_{k+1}|t_k] \cdot H^T(t_{k+1}) + \Lambda_y(t_{k+1})\}^{-1}. \tag{37}$$

Further, the correction circuit 302 may be configured to determine a (k+1)-th subtraction sample $h(\hat{X}[t_{k+1}|t_{k+1}] \, t_{k+1})$ based on the measurement function $h(X(t),t)$ and the (k+1)-th corrected conditional mean state value $\hat{X}[t_{k+1}|t_{k+1}]$. Moreover, the correction circuit 302 may be configured to determine a next output signal including the (k+1)-th corrected conditional mean state value $\hat{X}[t_{k+1}|t_{k+1}]$, the (k+1)-th corrected conditional error covariance value $P[t_{k+1}|t_{k+1}]$ and a (k+1)-th subtraction sample $h(\hat{X}[t_{k+1}|t_{k+1}] \, t_{k+1})$ and to transmit the output signal to the second delay circuit 310.

The second delay circuit 310 may be configured to transmit the received next output signal of the correction circuit 302 to the subtraction circuit 309 and to the integration circuit 312 after a delay that is determined based on the first clock signal.

Further, the first delay circuit 305 may be configured to transmit the next converted signal of the downconverter 204 to the subtraction circuit 309 after a delay that is predetermined in such a way that the subtraction circuit 309 may receive the next converted signal and the next output signal of the correction circuit 302 that is transmitted by the first delay circuit 310 at the same time.

The subtraction circuit 309 may be configured to determine a next output signal that is a subtraction of a signal corresponding to the (k+1)-th subtraction sample $h(X[t_{k+1}|t_{k+1}] \, t_{k+1})$ that is included in the received next output signal of the correction circuit 302 from the received next converted signal. Further, the subtraction circuit 309 may be configured to transmit the next output signal of the subtraction circuit 309 to the baseband circuit 208. The subtraction of the received next output signal of the correction circuit 302 from the received next converted signal by the subtraction circuit 309 may be the end of the next iteration process.

The (k+1)-th corrected conditional mean state value $\hat{X}[t_{k+1}|t_{k+1}]$ may be a (k+2)-th initial conditional mean state value and the (k+1)-th conditional error covariance value $P[t_{k+1}|t_{k+1}]$ may be a (k+2)-th initial conditional error covariance value.

Figure 5:
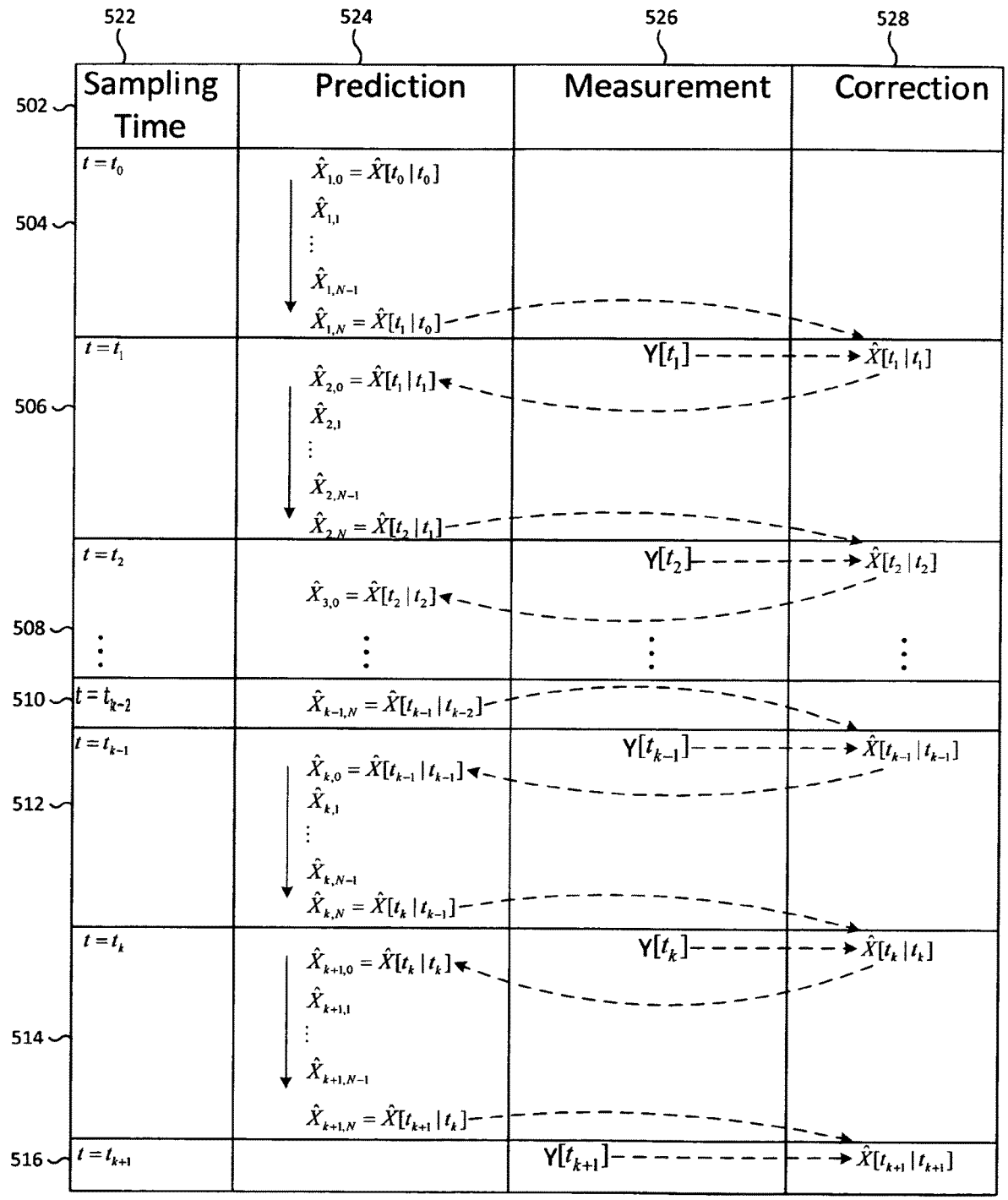
FIG. 5 shows a flow diagram of a determination of conditional mean state values and corrected conditional mean state values of the mitigation circuit.

FIG. 5 shows a flow diagram of the determination of conditional mean state values and corrected conditional mean state values in connection with the sampling times. As indicated by a headline row 502, a sampling time refers to a first column 522, a prediction refers to the determination of processing mean state value included in a second column 524, a measurement refers to measurement values included in a third column 526 and a correction refers to corrected conditional mean state values included in a fourth column 528.

The values included in boxes of a first row 504, a second row 506, a third row 508, a fourth row 510, a fifth row 512, a sixth row 514 and a seventh row 516 may be values associated with the first sampling time $t_0$, the second sampling time $t_1$, the third sampling time $t_2$, a sampling time $t_{k-2}$, a sampling time $t_{k-1}$, a sampling time $t_k$ and a sampling time $t_{k+1}$, respectively. A first box associated with the first row 504 and the second column 524 may include signal values that the integration circuit 312 may be configured to determine in the first determination iteration. The integration circuit 312 may be configured to determine a conditional mean state value $X_{11}$ in consideration of the initial conditional mean state value $\hat{X}[t_0|t_0]$. In the first determination iteration, the integration circuit 312 may be configured to determine further conditional mean state values in consideration of the previous conditional mean state values, respectively. Moreover, the integration circuit 312 may be configured to determine a final conditional mean state value $\hat{X}_{1,N}$ that may be the first conditional mean state value $\hat{X}[t_1|t_0]$.

A second box associated with the second row 506 and the third column 526 may include the first measurement value $Y_1$.

A third box associated with the second row 506 and the fourth column 528 may include the first corrected conditional mean state value $\hat{X}[t_1|t_1]$ that the correction circuit 302 may be configured to determine in consideration of the first conditional mean state value $\hat{X}[t_1|t_0]$ and the first measurement value $Y_1$.

A fourth box associated with the second row 506 and the second column 524 may include processing state values that the integration circuit 312 may be configured to determine in a second determination iteration. In the second determination iteration, the integration circuit 312 may be configured to determine a processing mean state value $\hat{X}_{2,0}$ to be the first corrected conditional mean state value $\hat{X}[t_1|t_1]$. In the second determination iteration, the integration circuit 312 may be configured to determine further conditional mean state values in consideration of the previous conditional mean state values in accordance with the formulas (20) to (30) with an iteration index value 1, respectively. Moreover, the integration circuit 312 may be configured to determine a final conditional mean state value $\hat{X}_{2,N}$ that may be the second conditional mean state value $\hat{X}[t_2|t_1]$.

A fifth box associated with the third row 508 and the third column 526 may include a second measurement value $Y_2$.

A sixth box associated with the third row 508 and the fourth column 528 may include the second corrected conditional mean state value $\hat{X}[t_2|t_2]$ that the correction circuit 302 may be configured to determine in consideration of the second conditional mean state value $\hat{X}[t_2|t_1]$, the iteration index value 1 and the second measurement value $Y_2$ based on formulas (32) to (37).

A seventh box associated with the third row 508 and the second column 524 may include processing state values that the integration circuit 312 may be configured to determine in a third determination iteration. In the third determination iteration, the integration circuit 312 may be configured to determine a conditional mean state value $\hat{X}_{3,0}$ to be the second corrected conditional mean state value $\hat{X}[t_2|t_2]$. In the third determination iteration, the integration circuit 312 may be configured to determine further conditional mean state values in accordance with the formulas (20) to (30) with an iteration index value 2 in consideration of the previous conditional mean state values, respectively. Moreover, the integration circuit 312 may be configured to determine a final conditional mean state value $\hat{X}_{3,N}$ that may be a third conditional mean state value $\hat{X}[t_3|t_2]$.

An eighth box associated with the fourth row 510 and the second column 524 may include a processing state value $\hat{X}_{k-1,N}$ that the integration circuit 312 may be configured to determine in a determination iteration associated with an iteration index value k−2. The processing state value $\hat{X}_{k-1,N}$ may be a (k−1)-th conditional mean state value $\hat{X}[t_{k-1}|t_{k-2}]$.

A ninth box associated with the fifth row 512 and the third column 526 may include a measurement value $Y_{k-1}$.

A tenth box associated with the fifth row 512 and the fourth column 528 may include a (k−1)-th corrected conditional mean state value $\hat{X}[t_{k-1}|t_{k-1}]$ that the correction circuit 302 may be configured to determine in consideration of a (k−1)-th conditional mean state value $\hat{X}[t_{k-1}|t_{k-2}]$, the measurement value $Y_{k-1}$ and the iteration index value k−1 based on formulas (32) to (37).

An eleventh box associated with the fifth row 512 and the second column 524 may include processing state values that the integration circuit 312 may be configured to determine in a determination iteration associated with the iteration index value k−1. In the determination iteration associated with the iteration index value k−1, the integration circuit 312 may be configured to determine a conditional mean state value $\hat{X}_m$) to be the (k−1)-th corrected conditional mean state value $\hat{X}[t_{k-1}|t_{k-1}]$. In the determination iteration associated with the iteration index value k−1, the integration circuit 312 may be configured to determine further conditional mean state values in consideration of the previous conditional mean state values, respectively, in accordance with the formulas (20) to (30) with an iteration index value k−1. Moreover, the integration circuit 312 may be configured to determine a final conditional mean state value $\hat{X}_{k,N}$ that may be a k-th conditional mean state value $\hat{X}[t_k|t_{k-1}]$.

A twelfth box associated with the sixth row 514 and the third column 526 may include a measurement value $Y_k$.

A thirteenth box associated with the sixth row 514 and the fourth column 528 may include a k-th corrected conditional mean state value $\hat{X}[t_k|t_k]$ that the correction circuit 302 may be configured to determine in consideration of the k-th conditional mean state value $\hat{X}[t_k|t_{k-1}]$, the measurement value $Y_k$ and the iteration index value k−1 based on formulas (32) to (37).

A fourteenth box associated with the sixth row 514 and the second column 524 may include processing state values that the integration circuit 312 may be configured to determine in a determination iteration associated with k. In the determination iteration associated with k, the integration circuit 312 may be configured to determine a conditional mean state value $\hat{X}_{k+1,0}$ to be the k-th corrected conditional mean state value $\hat{X}[t_k|t_k]$. In the determination iteration associated with k, the integration circuit 312 may be configured to determine further conditional mean state values in consideration of the previous conditional mean state values, respectively, in accordance with the formulas (20) to (30) with an iteration index value k. Moreover, the integration circuit 312 may be configured to determine a final conditional mean state value $\hat{X}_{k+1,N}$ that may be a (k+1)-th conditional mean state value $\hat{X}[t_{k+1}|t_k]$.

A fifteenth box associated with the seventh row 516 and the third column 526 may include a measurement value $Y_{k+1}$.

A sixteenth box associated with the seventh row 516 and the fourth column 528 may include a (k+1)-th corrected conditional mean state value $\hat{X}[t_{k+1}|t_{k+1}]$ that the correction circuit 302 may be configured to determine in consideration of the (k+1)-th conditional mean state value $\hat{X}[t_{k+1}|t_k]$, the measurement value $Y_{k+1}$ and the iteration index value k based on formulas (32) to (37).

In an example of an integration circuit that may be configured to determine an output signal in consideration of a nonlinear filtering algorithm that is not an Extended Kalman Filter, the formulas (17), (18), (19), (30), (34), (35), (36) and (37) may be adapted.

Figure 6:
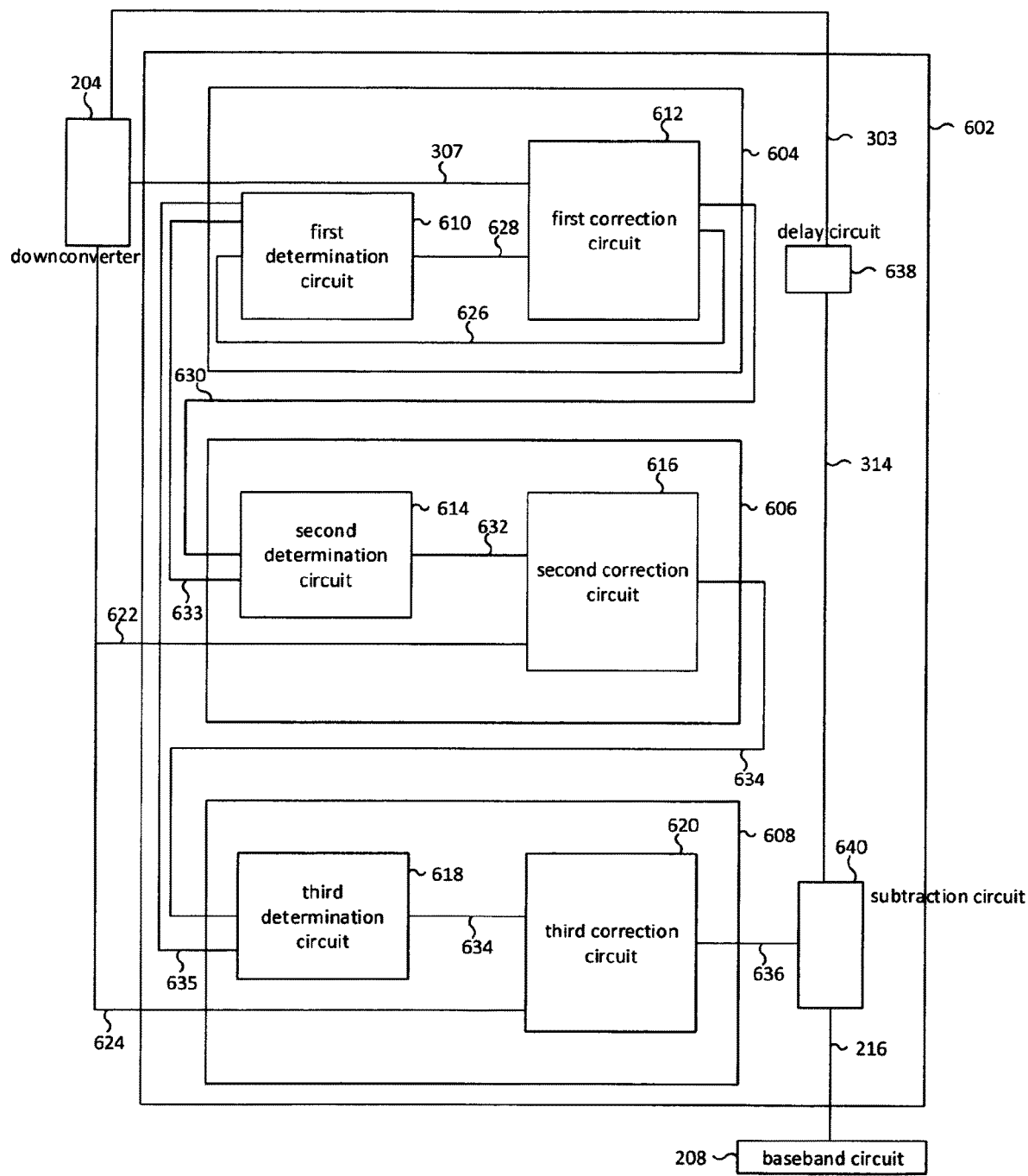
FIG. 6 shows a schematic diagram of a mitigation circuit of a third wireless mobile device according to an example.

FIG. 6 shows a schematic diagram of a lag-two smoother 602, the downconverter 204 and the baseband circuit 208 of a third wireless mobile device according to an example. Features of the example of FIG. 6 that correspond to those of the example of FIG. 1, FIG. 2, FIG. 3, FIG. 4 and FIG. 5 are indicated by the same reference numerals.

The lag-two smoother 602 may include a nonlinear filter 604, a first lag processing stage 606, a second lag processing stage 608, a third delay circuit 638 instead of the first delay circuit 305 and a subtraction circuit 640 instead of the subtraction circuit 309. The nonlinear filter 604 may include a first determination circuit 610 and a first correction circuit 612. Further, the first lag processing stage 606 may include a second determination circuit 614 and a second correction circuit 616. Moreover, the second lag processing stage 608 may include a third determination circuit 618 a third correction circuit 620.

In the example, the third wireless mobile device may include the Extended Kalman Filter as nonlinear filtering algorithm. Instead of the Extended Kalman Filter, the nonlinear filter 604, the first lag processing stage 606 and the second lag processing stage 608 may be configured to determine output signals in consideration of the second order Extended Kalman Filter, the Iterated Kalman Filter, the Quadrature Kalman Filter or the Unscented Kalman Filter.

Further, the downconverter 204 may be connected with the first correction circuit 612 via the fourth connection 307, the second correction circuit 616 via a fifteenth connection 622, the third correction circuit 620 via a sixteenth connection 624 and with the third delay circuit 638 via the third connection 303. The first correction circuit 612 may be connected with the first determination circuit 610 via a seventeenth connection 626 that may include the seventh connection 318 and the tenth connection 324. Further, the first correction circuit 612 may be connected with the first determination circuit 610 via an eighteenth connection 628 that may include the fourteenth connection 332 and the eighth connection 320. Moreover, the first correction circuit 612 may be connected with the second determination circuit 614 via a nineteenth connection 630.

The second determination circuit 614 may be connected with the second correction circuit 616 via a twentieth connection 632 and with the first determination circuit 610 via a twenty-first connection 633. The second correction circuit 616 may be connected with the third determination circuit 618 via a twenty-second connection 634. The third determination circuit 618 may be connected with the first determination circuit 610 via a twenty-third connection 635. Further, the third correction circuit 620 may be connected with the subtraction circuit 640 via a twenty-fourth connection 636. The subtraction circuit 640 may be connected with the baseband circuit 208 via the second connection 216.

The first determination circuit 610 may be configured to determine the k-th conditional mean state value $\hat{X}[t_k|t_{k-1}]$ and the k-th conditional error covariance value $P[t_k|t_{k-1}]$ as the determination circuit 304 according to the example of FIG. 3. Further, the first correction circuit 612 may be configured to determine an output signal including the k-th corrected conditional mean state value $\hat{X}[t_k|t_k]$ and the k-th corrected conditional error covariance value $P[t_k|t_k]$ based on the first device configuration initial condition $X(t_0)$, the second device configuration initial condition $P(t_0)$ and measurement values $Y(t_1), \ldots, Y(t_k)$ that the first correction circuit 612 may be configured to receive from the downconverter 204, the k-th conditional mean state value $\hat{X}[t_k|t_{k-1}]$ and the k-th conditional error covariance value $P[t_k|t_{k-1}]$ as the correction circuit 312. Further, the first correction circuit 612 may be configured to transmit the determined output signal to the second determination circuit 614.

The second determination circuit 614 may be configured to determine a first initialization value $\hat{X}_1[t_k^+|t_k]$, a second initialization value $P_1[t_k^+|t_k]$ and a third initialization value $P_{1,1}[t_k^+|t_k]$ by formulas (38), (39) and (40), respectively:

$$\hat{X}_1[t_k^+|t_k] = \hat{X}[t_k|t_k], \quad (38)$$

$$P_1[t_k^+|t_k] = P[t_k|t_k] \quad (39)$$

and $$P_{1,1}[t_k^+|t_k] = P[t_k|t_k] \quad (40)$$

in consideration of the k-th corrected conditional mean state value $\hat{X}[t_k|t_k]$, the k-th corrected conditional error covariance value $P[t_k|t_k]$, an infinitesimal value $\in$ and a first time constant $t_k^+$ that the second determination circuit 614 may be configured to determine by $t_k^+ = (t_k + \in)$.

The second determination circuit 614 may be configured to determine a first conditional mean state lag-one value $\hat{X}_1$ [$t_{k+1}|t_k$], a first conditional error covariance lag-one value $P_1[t_{k+1}|t_k]$ and a first conditional error covariance lag-one-one value $P_{1,1}[t_{k+1}|t_k]$ by formulas (41), (42) and (43), respectively:

$$\hat{X}_1[t_{k+1}|t_k] = \hat{X}_1[t_k^+|t_k], \quad (41)$$

$$P_1[t_{k+1}|t_k] = \int_{t_k^+}^{t_{k+1}} P_{1,1}[t|t_k] \cdot F[t_k] dt, \quad (42)$$

$$P_{1,1}[t_{k+1}|t_k] = P_{1,1}[t_k^+|t_k], \quad (43)$$

in consideration of the first initialization value $\hat{X}_1[t_k^+|t_k]$, the second initialization value $P_1[t_k^+|t_k]$, the third initialization value $P_{1,1}[t_k^+|t_k]$, the infinitesimal value $\in$, the first time constant $t_k^+$ and a numerical integration $$\int_{t_k^+}^{t_{k+1}} P_{1,1}[t|t_k] \cdot F[t_k] dt.$$

Moreover, the second determination circuit 614 may be configured to determine an output signal that includes the determined values and to transmit the output signal to the second correction circuit 616.

Further, the first determination circuit 610 may be configured to determine the (k+1)-th conditional mean state value $\hat{X}[t_{k+1}|t_k]$ and the (k+1)-th conditional error covariance value $P[t_{k+1}|t_k]$ and to transmit determined values to the second determination circuit 614. The second determination circuit 614 may be configured to transmit the (k+1)-th conditional mean state value $\hat{X}[t_{k+1}|t_k]$ and the (k+1)-th conditional error covariance value $P[t_{k+1}|t_k]$ to the second correction circuit 616. As an alternative, the first determination circuit 610 may be configured to transmit the (k+1)-th conditional mean state value $\hat{X}[t_{k+1}|t_k]$ and the (k+1)-th conditional error covariance value $P[(t_{k+1}|t_k]$ to the second correction circuit 616 via an appropriately provided connection that may connect the first determination circuit 610 with the second correction circuit 616.

The second correction circuit 616 may be configured to receive a (k+1)-th measurement value $Y(t_{k+1})$ that the downconverter 204 may be configured to sample at a (k+1)-th sampling time $t_{k+1}$. Further, the second correction circuit 616 may be configured to determine a first corrected conditional mean state lag-one value $\hat{X}_1[t_{k+1}|t_{k+1}]$, a first corrected conditional error covariance lag-one value $P_1[t_{k+1}|t_{k+1}]$ and a first corrected conditional error covariance lag-one-one value $P_{u}[t_{k+1}|t_{k+1}]$ by formulas (43), (44), (45) and (46):

$$K_1(t_{k+1}) = P_1[t_{k+1}|t_k] \cdot H^T(t_{k+1}) \cdot \{H(t_{k+1}) \cdot P[t_{k+1}|t_k] \cdot H^T(t_{k+1}) + \Lambda_y(t_{k+1})\}^{-1} \quad (43)$$

$$\hat{X}_1[t_{k+1}|t_{k+1}] = \hat{X}_1[t_{k+1}|t_k] + K_1(t_{k+1}) \cdot \{Y(t_{k+1}) - H(t_{k+1}) \cdot \hat{X}[t_{k+1}|t_k]\}, \quad (44)$$

$$P_1[t_{k+1}|t_{k+1}] = P_1[t_{k+1}|t_k] - K_1(t_{k+1}) \cdot H(t_{k+1}) \cdot P[t_{k+1}|t_k] \quad (45)$$

and $$P_{1,1}[t_{k+1}|t_{k+1}] = P_{1,1}[t_{k+1}|t_k] - K_1(t_{k+1}) \cdot H(t_{k+1}) \cdot P_1[t_{k+1}|t_k] \quad (46)$$

in consideration of the (k+1)-th measurement value $Y(t_{k+1})$, the first derivative function value $H(t_{k+1})$, the (k+1)-th value $\Lambda_y(t_{k+1})$ of the second function $\Lambda_y(t)$, the (k+1)-th conditional mean state value $\hat{X}[t_{k+1}|t_k]$ and the (k+1)-th conditional error covariance value $P[(t_{k+1}|t_k]$. Further, the second correction circuit 616 may be configured to determine an output signal that may include the determined values of the second correction circuit 616 and to transmit the output signal to the third determination circuit 618.

The third determination circuit 618 may be configured to determine a fourth initialization value $\hat{X}_2[t_{k+1}^+|t_{k+1}]$, a fifth initialization value $P_2[t_{k+1}^+|t_{k+1}]$ and a sixth initialization value $P_{2,2}[t_{k+1}^+|t_{k+1}]$ by formulas (47), (48) and (49), respectively:

$$\hat{X}_2[t_{k+1}^+|t_{k+1}] = \hat{X}_1[t_{k+1}|t_{k+1}], \quad (47)$$

$$P_2[t_{k+1}^+|t_{k+1}] = P_1[t_{k+1}|t_{k+1}] \quad (48)$$

and $$P_{2,2}[t_{k+1}^+|t_{k+1}] = P_{1,1}[t_{k+1}|t_{k+1}] \quad (49)$$

in consideration of the first corrected conditional mean state lag-one value $\hat{X}_1[t_{k+1}|t_{k+1}]$, the first corrected conditional error covariance lag-one value $P_1[t_{k+1}|t_{k+1}]$, the first corrected conditional error covariance lag-one-one value $P_{1,1}[t_{k+1}|t_{k+1}]$, the infinitesimal value $\in$ and a second time constant $t_{k+1}^+$ that the third determination circuit 618 may be configured to determine by $t_{k+1}^+ = (t_{k+1} + \in)$.

Further, the third determination circuit 618 may be configured to determine a first conditional mean state lag-two value $\hat{X}_2[t_{k+2}|t_{k+1}]$, a first conditional error covariance lag-two value $P_2[t_{k+2}|t_{k+1}]$ and a first conditional error covariance lag-two-two value $P_{2,2}[t_{k+2}|t_{k+1}]$ by formulas (50), (51) and (52), respectively:

$$\hat{X}_2[t_{k+2}|t_{k+1}] = \hat{X}_2[t_{k+1}^+|t_{k+1}], \quad (50)$$

$$P_2[t_{k+2}|t_{k+1}] = \int_{t_{k+1}^+}^{t_{k+2}} P_2[t|t_{k+1}] \cdot F[t_{k+1}] dt, \quad (51)$$

$$P_{2,2}[t_{k+2}|t_{k+1}] = P_{2,2}[t_{k+1}^+|t_{k+1}], \quad (52)$$

in consideration of the fourth initialization value $\hat{X}_2[t_{k+1}^+|t_{k+1}]$, the fifth initialization value $P_2[t_{k+1}^+|t_{k+1}]$ and the sixth initialization value $P_{2,2}[t_{k+1}^+|t_{k+1}]$, the infinitesimal value $\in$, the second time constant $t_{k+1}^+$ and a numerical integration $$\int_{t_{k+1}^+}^{t_{k+2}} P_2[t|t_{k+1}] \cdot F[t_{k+1}] dt.$$

Moreover, the third determination circuit 618 may be configured to determine an output signal that may include the determined values and to transmit the output signal to the third correction circuit 620.

Further, the first determination circuit 610 may be configured to determine a (k+2)-th conditional mean state value $\hat{X}[t_{k+2}|t_{k+1}]$ and a (k+2)-th conditional error covariance value $P[t_{k+2}|t_{k+1}]$ and to transmit the determined values to the third determination circuit 618. The third determination circuit 618 may be configured to transmit the (k+2)-th conditional mean state value $\hat{X}[t_{k+2}|t_{k+1}]$ and the (k+2)-th conditional error covariance value $P[t_{k+2}|t_{k+1}]$ to the third correction circuit 620. As an alternative, the first determination circuit 610 may be configured to transmit the (k+2)-th conditional mean state value $\hat{X}[t_{k+2}|t_{k+1}]$ and the (k+2)-th conditional error covariance value $P[t_{k+2}|t_{k+1}]$ to the third correction circuit 620 via an appropriately provided connection that may connect the first determination circuit 610 with the third correction circuit 620.

The third correction circuit 620 may be configured to receive a (k+2)-th measurement value $Y(t_{k+2})$ that the downconverter 204 may be configured to sample at a (k+2)-th sampling time $t_{k+2}$. Further, the third correction circuit 620 may be configured to determine a first corrected conditional mean state lag-two value $\hat{X}_2[t_{k+2}|t_{k+2}]$, a first corrected conditional error covariance lag-two value $P_2[t_{k+2}|t_{k+2}]$ and a first corrected conditional error covariance lag-two-two value $P_{2,2}[t_{k+2}|t_{k+2}]$ by formulas (53), (54), (55) and (56):

$$K_2(t_{k+2}) = P_2[t_{k+2}|t_{k+1}] \cdot H^T(t_{k+2}) \cdot \{H(t_{k+2}) \cdot P[t_{k+2}|t_{k+1}] \cdot H^T(t_{k+2}) + \Lambda_y(t_{k+2})\}^{-1} \quad (53)$$

$$\hat{X}_2[t_{k+2}|t_{k+2}] = \hat{X}_2[t_{k+2}|t_{k+1}] + K_2(t_{k+2}) \cdot \{Y(t_{k+2}) - H(t_{k+2}) \cdot \hat{X}[t_{k+2}|t_{k+1}]\}, \quad (54)$$

$$P_2[t_{k+2}|t_{k+2}] = P_2[t_{k+2}|t_{k+1}] - K_2(t_{k+2}) \cdot H(t_{k+2}) \cdot P[t_{k+2}|t_{k-1}] \quad (55)$$

and $$P_{2,2}[t_{k+2}|t_{k+2}] = P_{2,2}[t_{k+2}|t_{k+1}] - K_2(t_{k+2}) \cdot H(t_{k+2}) \cdot P_2[t_{k+2}|t_{k+1}] \quad (56)$$

in consideration of the (k+2)-th measurement value $Y(t_{k+2})$, a second derivative function value $H(t_{k+2})$ of the second derivative function H(t), a (k+2)-th value $\Lambda_y(t_{k+1})$ of the second function $\Lambda_y(t)$, the (k+2)-th conditional mean state value $\hat{X}[t_{k+2}|t_{k+1}]$ and the (k+2)-th conditional error covariance value $P[t_{k+2}|t_{k+1}]$. Further, the third correction circuit 620 may be configured to determine a smoother subtraction sample $h(\hat{X}_2[t_{k+2}|t_{k+2}], t_{k+2})$ based on the measurement function h(X(t),t) and the first corrected conditional mean state lag-two value $\hat{X}_2[t_{k+2}|t_{k+2}]$. Moreover, the third correction circuit 620 may be configured to determine an output signal that includes the smoother subtraction sample $h(\hat{X}_2[t_{k+2}|t_{k+2}], t_{k+2})$ and to transmit the output signal to the subtraction circuit 640.

Further, a lag-i value $\hat{X}_i[t_n|t_m]$ may be a value $\hat{X}[t_{n-i}|t_m]$ in consideration of integers i, n and m. Moreover, a lag-i value $P_i[t_n|t_m]$ may be a value $P[t_{n-i}|t_m]$. Further, a lag-i-i value $P_{i,i}[t_n|t_m]$ may be a value $P[t_{n-i}|t_m]$. As an example, the second corrected conditional mean state lag-two value $\hat{X}_2[t_{k+2}|t_{k+2}]$ may be a smoothed conditional mean state value $\hat{X}[t_k|t_{k+2}]$.

Further, the downconverter 204 may be configured to transmit the signal portion including the measurement value $Y(t_k)$ to the third delay circuit 638. The third delay circuit 638 may be configured to delay and transmit the signal portion including the measurement value $Y(t_k)$ such that the output signal of the third correction circuit 620 and the signal portion including the measurement value $Y(t_k)$ arrive at the same time.

The subtraction circuit 640 may be configured to determine an output signal that may be a subtraction of a signal corresponding to the smoother subtraction sample $h(\hat{X}_2[t_{k+2}|t_{k+2}], t_{k+2})$ from the signal portion that includes the measurement value $Y(t_k)$. Further, the subtraction circuit 640 may be configured to transmit the output signal of the subtraction circuit 640 to the baseband circuit 208.

In a snapshot view at the sampling time $t_{k+2}$, the first correction circuit 612 may be configured to determine a (k+2)-th corrected conditional mean state value $\hat{X}[t_{k+2}|t_{k+2}]$ and a (k+2)-th corrected conditional error covariance value $P[t_{k+2}|t_{k+2}]$. Further, the second determination circuit 614 may be configured to determine at the sampling time $t_{k+2}$ a (k+2)-th conditional mean state lag-one value $\hat{X}_1[t_{k+2}|t_{k+1}]$, a (k+2)-th conditional error covariance lag-one value $P_1[t_{k+}$ $_2|t_{k+1}]$ and a (k+2)-th conditional error covariance lag-one-one value $P_{1,1}[t_{k+2}|t_{k+1}]$. Moreover, the second correction circuit 616 may be configured to determine at the sampling time $t_{k+2}$ a first corrected conditional mean state lag-one value $\hat{X}_1[t_{k+2}|t_{k+2}]$, a first corrected conditional error covariance lag-one value $P_1[t_{k+2}|t_{k+2}]$ and a first corrected conditional error covariance lag-one-one value $P_{1,1}[t_{k+2}|t_{k+2}]$. Further, the third determination circuit 618 may be configured to determine at the sampling time $t_{k+2}$ the first conditional mean state lag-two value $\hat{X}_2[t_{k+2}|t_{k+1}]$, the first conditional error covariance lag-two value $P_2[t_{k+2}|t_{k+1}]$ and the first conditional error covariance lag-two-two value $P_{2,2}[t_{k+2}|t_{k+}]$. Moreover, the third correction circuit 620 may be configured to determine the first corrected conditional mean state lag-two value $\hat{X}_2[t_{k+2}|t_{k+2}]$, the first corrected conditional error covariance lag-two value $P_2[t_{k+2}|t_{k+2}]$ and the first corrected conditional error covariance lag-two-two value $P_{2,2}[t_{k+2}|t_{k+2}]$.

All other aspects of the first determination circuit 610 may correspond to aspects of the first determination circuit 312 according to the example of FIG. 3. All other aspects of the first correction circuit 612 may correspond to aspects of the first correction circuit 302 according to the example of FIG. 3. All other aspects of the lag-two smoother 602 may correspond to aspects of the interference signal mitigation circuit 206. Further, all other aspects of the wireless mobile device according to the example of FIG. 6 may correspond to aspects of the wireless mobile device 102 according to the example of FIG. 1, FIG. 2, FIG. 3, FIG. 4 and FIG. 5.

Figure 7:
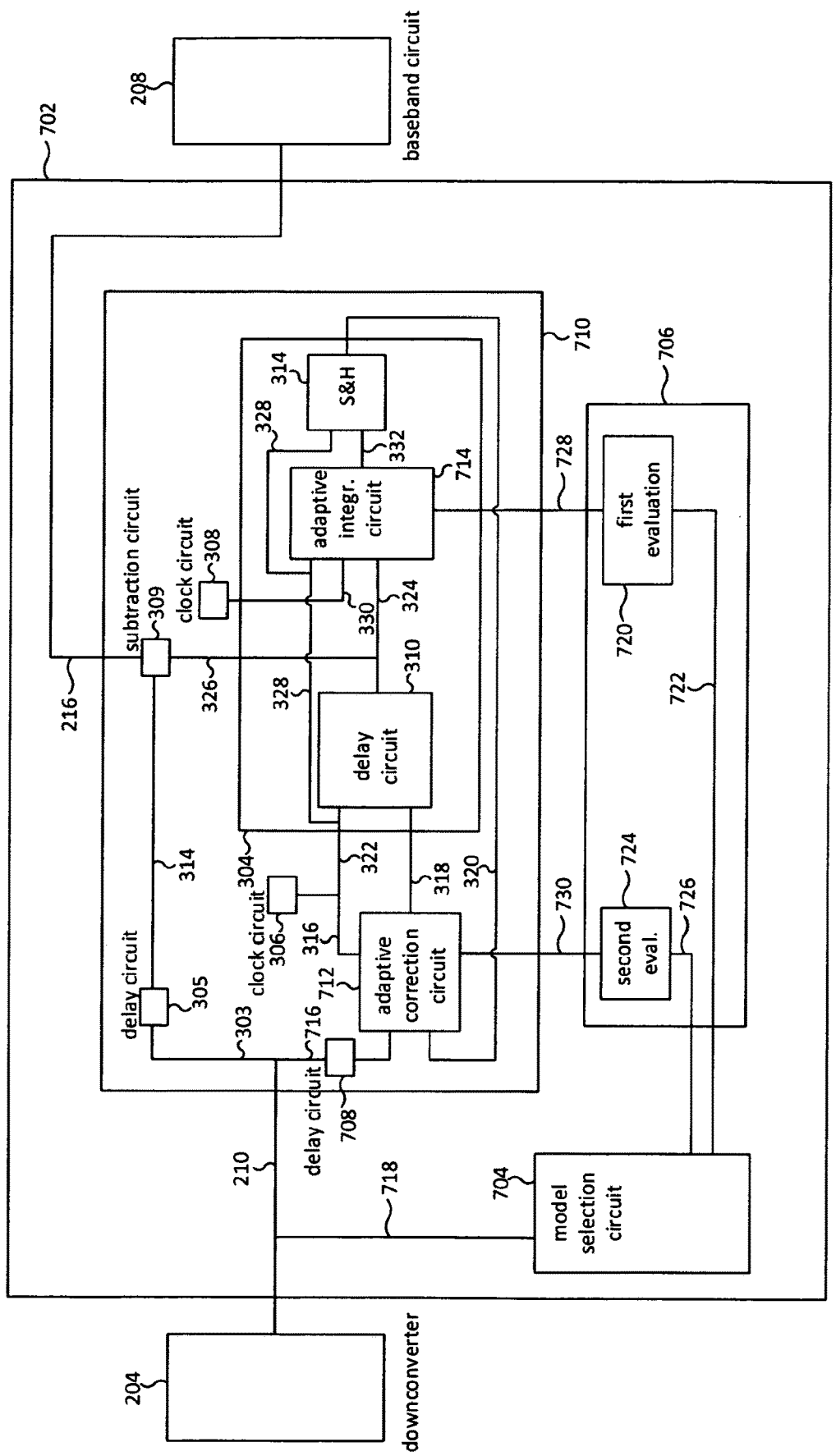
FIG. 7 shows a schematic drawing of the downconverter, the baseband circuit and an adaptive mitigation circuit of a fourth wireless mobile device according to an example.

FIG. 7 shows a schematic drawing of the downconverter 204, the baseband circuit 208 and an adaptive mitigation circuit 702 of a fourth wireless mobile device according to an example. The adaptive mitigation circuit 702 may include a model selection circuit 704, an interference signal model circuit 706 and an adaptive subtraction circuit 710. The adaptive subtraction circuit 710 may include an adaptive correction circuit 712, an adaptive integration circuit 714 and a detection delay circuit 708. Features of the example of FIG. 7 that correspond to those of the examples of FIG. 1 to FIG. 6 are indicated by the same reference numerals.

The downconverter 204 may be connected with the detection delay circuit 708 via a twenty-fifth connection 716 and with the model selection circuit 704 via a twenty-sixth connection 718. The model selection circuit 704 may be connected with a first evaluation circuit 720 of the interference signal model circuit 706 via a twenty-seventh connection 722 and with a second evaluation circuit 724 of the interference signal model circuit 706 via a twenty-eighth connection 726. The first evaluation circuit 720 may be connected with the adaptive integration circuit 714 via a twenty-ninth connection 728. The second evaluation circuit 724 may be connected with the adaptive correction circuit 712 via a thirtieth connection 730.

Further, the downconverter 204 may be configured to transmit a signal sample included in the converted baseband signal to the detection delay circuit 708, the first delay circuit 305 and the model selection circuit 704. The model selection circuit 704 may be configured to select a first interference signal model from a plurality of interference signal models based on the statistics of a received signal that is included in the baseband signal. The first interference signal model may include model functions $f_1(X,t)$, $G_1(X,t)$, $v_1(t)$, $h_1(X,t)$, $\Lambda_{x,1}$ and $\Lambda_{y,1}$. Further, the model functions $f_1(X,t)$, $G_1(X,t)$, $v_1(t)$, $h_1(X,t)$, $\Lambda_{x,1}$ and $\Lambda_{y,1}$ may be the functions $f(X,t)$, $G(X,t)$, $v(t)$, $h(X,t)$, $\Lambda_x$ and $\Lambda_y$ of the example of FIG. 1 to FIG. 5, respectively.

In an example, the model selection circuit 704 may include a neural network circuit that may be configured to select the first interference signal model from the plurality of interference signal models based on a statistical property of the received signal that is different from a statistical property of white Gaussian noise. In an example, the model selection circuit 704 may include a statistics determination circuit that may be configured to determine a model classification rule for a set of interference signal models based on the most prominent set of statistical differences between the interference signal models. Further, the model selection circuit 704 may be configured to transmit an output signal including a model detection information of the selected interference signal model to the first evaluation circuit 720 and the second evaluation circuit 724.

The first evaluation circuit 720 may be configured to determine integration process function values of the functions $f$, $F$, $\Lambda_x$, $G$ and $R$ that are included in the formulas (18) to (31) and to transmit the integration process function values to the adaptive integration circuit 714. Alternatively, the first evaluation circuit 720 may be configured to determine integration process function values of $f$, $F$ and $G \cdot \Lambda_x \cdot G^T$. In case of the Extended Kalman Filter, the adaptive integration circuit 714 may be configured to receive the integration process function values and to determine the processing mean state values $\hat{X}_{k+1,1}, \ldots, \hat{X}_{k+1,N}$ and the processing error covariance values $P_{k+1,1}, \ldots, P_{k+1,N}$ based on the received integration process function values and the formulas (18) to (31) in consideration of the first iteration index value k.

Further, the second evaluation circuit 724 may be configured to determine correction process function values of the functions $\Lambda_y$, h, H and v that are included in the formulas (32) to (37) and to transmit the integration process function values to the adaptive correction circuit 712. The adaptive correction circuit 714 may be configured to receive the correction process function values and to determine the conditional mean state value $\hat{X}[k+1,k+1]$ and the conditional error covariance value $P[t_{k+1}|t_{k+1}]$ based on the received correction process function values and the formulas (32) to (37) in consideration of the first iteration index value k.

Moreover, the detection delay circuit 708 may be configured to delay the signal sample such that the model selection circuit 704 has selected the first interference signal model, the adaptive correction circuit 712 has determined the correction process function values and the adaptive integration circuit 714 has determined the integration process function values.

All other aspects of the adaptive integration circuit 714 and the adaptive correction circuit 712 may correspond to aspects of the integration circuit 312 and the correction circuit 302 according to the example of FIGS. 2 to 5, respectively. All other aspects of the adaptive subtraction circuit 710 may correspond to aspects of the interference signal mitigation circuit 206 according to the example of FIGS. 2 to 5. Further, all other aspects of the fourth wireless mobile device may correspond to aspects of the first wireless mobile device 102.

In an example, the first interference signal model of the examples of FIGS. 1 to 7 may be a chaotic model of a Unified Chaotic System (UCS). The Unified Chaotic System may include system equations that may be a system of a first formula (57), a second formula (58) and a third formula (59):

$$\dot{x}_1 = (25\alpha + 10)(x_2 - x_1), \qquad (57)$$

$$\dot{x}_2 = (28 - 35\alpha)x_1 - x_1 x_3 + (29\alpha - 1)x_2, \qquad (58)$$

and $$\dot{x}_3 = x_1 x_2 - \left(\frac{\alpha + 8}{3}\right) x_3 \qquad (59)$$

in consideration of a parameter a that may have a value of the domain [0, 1] and three state variables of the model from which a first state variable may be referenced by $x_1$, a second state variable may be referenced by $x_2$ and a third state variable may be referenced by $x_3$. If α is 0, 0.8 or 1 the chaotic model may be a model of the Lorenz chaotic system, the Lü chaotic system or the Chen chaotic system, respectively. The chaotic model may be deterministic and may have similar properties to stochastic interference signal models. Further, the chaotic model may be selected and/or predefined to be the first interference signal model if a one dimensional probability density function of a received signal, a two dimensional probability density function of the received signal or other statistical properties of the received signal fit the statistics of a nonlinear function of the state variables of the chaotic model.

The chaotic model may include a first model function $f_1$ that may be the function $f$ of formula (12). Further, at least one of the model selection circuit 704, the first evaluation circuit 720, the second model evaluation circuit 724, the integration circuit 312 or the correction circuit 302 may be configured to determine the first model function $f_1$ by a formula (60):

$$f(X, t) = \begin{pmatrix} (25\alpha + 10)(x_2(t) - x_1(t)) \\ (28 - 35\alpha)x_1(t) - x_1(t)x_3(t) + (29\alpha - 1)x_2(t) \\ x_1(t)x_2(t) - \left(\frac{\alpha + 8}{3}\right) x_3(t) \end{pmatrix}, \qquad (60)$$

in consideration of scalar functions $x_1(t)$, $x_2(t)$ and $x_3(t)$ of the time and an interference signal random variable X(t) that may be $(x_1(t), x_2(t), x_3(t))^T$.

Further, the chaotic model may include a second model function $G_1$ that may be the function G of formula (12). Moreover, at least one of the model selection circuit 704, the first evaluation circuit 720, the second model evaluation circuit 724, the integration circuit 312 or the correction circuit 302 may be configured to determine the second model function $G_1$ by a formula (61):

$$G(X, t) = \begin{pmatrix} D_{p1} \\ D_{p2} \\ D_{p3} \end{pmatrix}, \qquad (61)$$

in consideration of noise gain constants $D_{p1}$, $D_{p2}$ and $D_{p3}$ that may be greater than 0, much smaller than 1, time invariant and independent of the interference signal random variable X.

Moreover, the chaotic model may include a third model function $h_1$ that may be an output function of the chaotic model and the function h of formula (13). Moreover, at least one of the model selection circuit 704, the first evaluation circuit 720, the second model evaluation circuit 724, the integration circuit 312 or the correction circuit 302 may be configured to determine the third model function $h_1$ by a formula (62):

$$h(X(t_{k+1}), t_{k+1}) = x_1(t_{k+1}), \qquad (62)$$

in consideration of the interference signal random variable X(t) that may be $(x_1(t), x_2(t), x_3(t))^T$.

Further, in case of the example of FIG. 7, the model selection circuit 704 may be configured to determine a fit of the third model function $h_1$ to the one dimensional probability density function of the received signal, the two dimensional probability density function of the received signal or other statistical properties of the received signal. The model selection circuit 704 may be configured to select the chaotic model as first interference signal model based on a comparison of the fit of the third model function $h_1$ and fits of model output functions of interference signal models of the plurality of interference signal models to the respective statistical property of the received signal.

Figure 8:
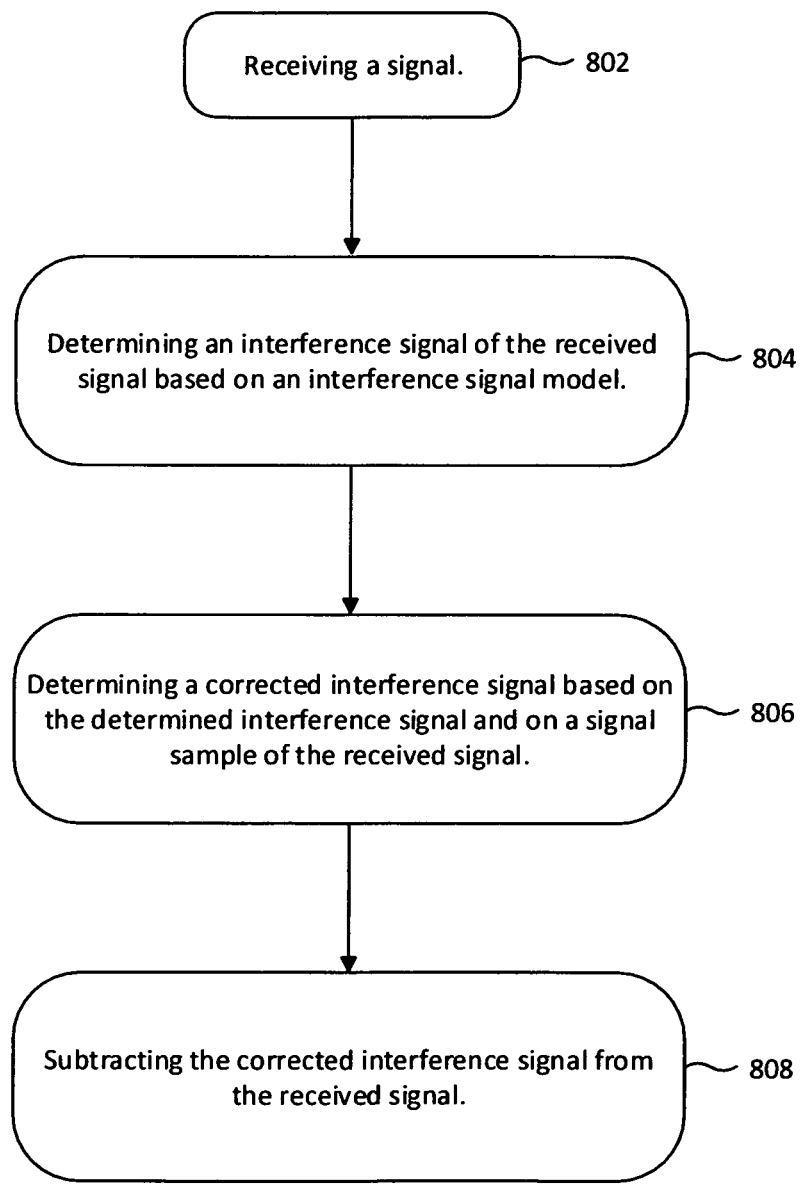
FIG. 8 shows a method for signal determination in radio communication.

FIG. 8 shows a method for signal determination in radio communication. The method may include, in 802, receiving a signal.

The method may further include, in 804, determining an interference estimation signal of the received signal based on an interference signal model.

The method may further include, in 806, determining a corrected interference estimation signal based on the determined interference estimation signal and on a signal sample of the received signal.

The method may further include, in 808, subtracting the corrected interference estimation signal from the received signal.

Figure 9:
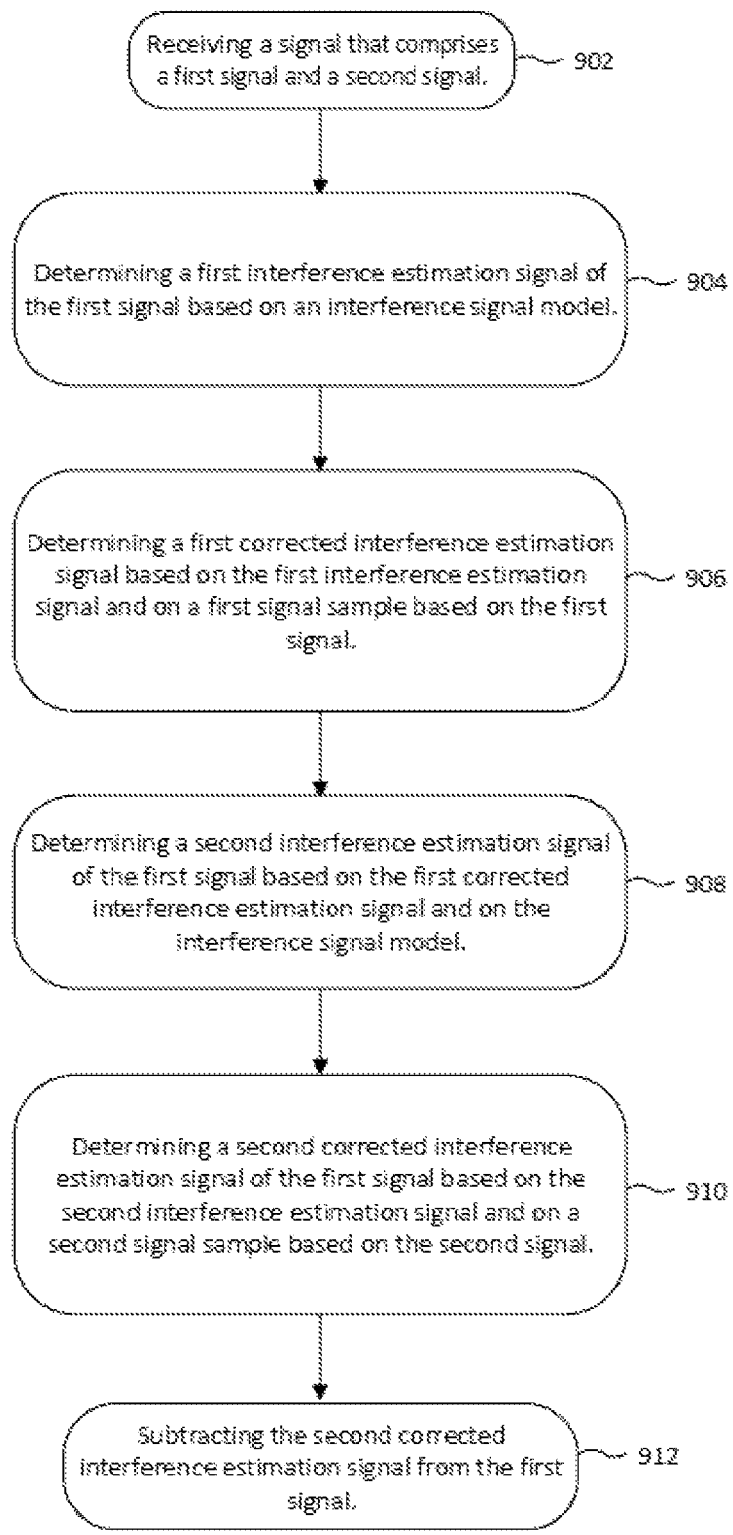
FIG. 9 shows a method for signal determination in radio communication.

FIG. 9 shows a method for signal determination in radio communication. The method may include, in 902, receiving a signal that comprises a first signal and a second signal.

The method may further include, in 904, determining a first interference estimation signal of the first signal based on an interference signal model.

The method may further include, in 906, determining a first corrected interference estimation signal based on the first interference estimation signal and on a first signal sample based on the first signal.

The method may further include, in 908, determining a second interference estimation signal of the first signal based on the first corrected interference estimation signal and on the interference signal model.

The method may further include, in 910, determining a second corrected interference estimation signal of the first signal based on the second interference estimation signal and on a second signal sample based on the second signal.

The method may further include, in 912, subtracting the second corrected interference estimation signal from the first signal.

It should be noted that aspects described in the context of the wireless mobile devices according to the examples of FIG. 1 to FIG. 7 are analogously valid for the methods that are illustrated in the context of FIG. 8 and FIG. 9.

In the following, various aspects of this description will be illustrated:

Example 1 is a communication device. The communication device may include a receiver configured to receive a signal, a determination circuit configured to determine an interference estimation signal of the received signal based on an interference signal model, a correction circuit configured to determine a corrected interference estimation signal based on the determined interference estimation signal and on a signal sample based on the received signal and a subtraction circuit configured to subtract the corrected interference estimation signal from the received signal.

In Example 2, the subject matter of Example 1 can optionally include that the communication device may include a sample circuit configured to sample the signal sample of the signal.

In Example 3, the subject matter of any one of Examples 1 to 2 can optionally include that the determination circuit may be configured to determine the interference estimation signal based on interference signal states of a plurality of interference signal states of the interference signal model. The determination circuit may be configured to determine at least one conditional moment of the interference signal states associated with a sampling time of the signal sample based on a time evolution of at least one time dependent conditional moment function associated with the interference signal model and may be the at least one conditional moment if evaluated at the sampling time. The determined interference estimation signal may include the at least one conditional moment of the interference signal states.

In Example 4, the subject matter of Example 3 can optionally include that the at least one conditional moment may be a plurality of conditional moments that may be associated with the sampling time. The at least one time dependent conditional moment function may be a plurality of time dependent conditional moment functions associated with the interference signal model and may be the conditional moments if evaluated at the sampling time, respectively. The time evolution of the plurality of time dependent conditional moment functions may be based on at least one coupled differential equation that may include the conditional moment functions of the plurality of time dependent conditional moment functions.

In Example 5, the subject matter of Example 4 can optionally include that the coupled differential equation may be based on a Fokker-Planck-Kolmogorov equation.

In Example 6, the subject matter of Example 5 can optionally include that the Fokker-Planck-Kolmogorov equation may be continuous in time.

In Example 7, the subject matter of any one of Examples 3 to 6 can optionally include that the at least one conditional moment may be a conditional average.

In Example 8, the subject matter of any one of Examples 4 to 7 can optionally include that the plurality of conditional moments may include a conditional variance or a conditional covariance.

In Example 9, the subject matter of any one of Examples 3 to 8 can optionally include that the communication device may be configured to determine an initial condition of the time evolution based on the interference signal model.

In Example 10, the subject matter of any one of Examples 4 to 9 can optionally include that the determination circuit may be configured to determine the at least one conditional moment based on a solution of the coupled differential equation that may include an integral with respect to the time. The determination circuit may be configured to integrate the integral numerically. The determination circuit may be configured to determine processing values of the numerical integration of the integral at a processing rate that may be higher than a sampling rate of the sample circuit.

In Example 11, the subject matter of Examples 10 can optionally include that the sampling rate corresponds to the Nyqumay bet frequency.

In Example 12, the subject matter of any one of Examples 3 to 11 can optionally include that the correction circuit may be configured to determine at least one corrected conditional moment based on the at least one conditional moment and the signal sample. The corrected interference estimation signal may include the at least one corrected conditional moment of the interference signal states.

In Example 13, the subject matter of Example 12 can optionally include that the at least one corrected conditional moment may be a corrected conditional average that may be determined based on the conditional average and the signal sample.

In Example 14, the subject matter of any one of Examples 12 to 13 can optionally include that the conditional moment may be an expectation value of a state function with respect to conditional state probabilities that may be Bayesian probabilities of the interference signal states under a first condition based on the initial condition. The at least one corrected conditional moment may be an expectation value of the state function with respect to corrected conditional state probabilities that may be probabilities of the interference signal states under the first condition and a second condition based on the signal sample.

In Example 15, the subject matter of any one of Examples 4 to 14 can optionally include that the at least one corrected conditional moment may be a plurality of corrected conditional moments that each may be corrected conditional moments of the interference signal states. The correction circuit may be configured to determine the corrected conditional moments of the plurality of corrected conditional moments based on the conditional moments of the plurality of conditional moments and the signal sample.

In Example 16, the subject matter of any one of Examples 4 to 15 can optionally include that the interference estimation signal may be a first iteration determination signal, the plurality of conditional moments may be a plurality of first iteration moments, the plurality of conditional moment functions may be a plurality of first iteration moment functions, the corrected interference estimation signal may be a first corrected interference estimation signal, the plurality of corrected conditional moments may be a plurality of first corrected iteration moments and the signal sample may be a first signal sample. The correction circuit may be configured to determine a first iteration correction signal that may include the plurality of first corrected iteration moments. The sample circuit may be configured to sample a second signal sample of the received signal. The determination circuit may be configured to determine a plurality of second iteration moments of the interference signal states that may be associated with a second sampling time of the second signal sample based on a second time evolution of second iteration moment functions that if evaluated at the second sampling time may be the second iteration moments, respectively, and on the first corrected iteration moments as an initial condition of the time evolution of the second iteration moment functions. The determination circuit may be configured to determine a second iteration determination signal that may include the second iteration moments. The correction circuit may be configured to determine a plurality of second corrected iteration moments of the interference signal states based on the second iteration moments and the second signal sample. The correction circuit may be configured to determine a second corrected interference estimation signal that may include at least a single second corrected iteration moment of the second corrected iteration moments. The subtraction circuit may be configured to subtract the second corrected interference estimation signal from the received signal.

In Example 17, the subject matter of Example 16 can optionally include that the second time evolution may be based on the Fokker-Planck-Kolmogorov equation. The Fokker-Planck-Kolmogorov equation may include the second iteration moments of the plurality of second iteration moment functions.

In Example 18, the subject matter of any one of Examples 3 to 17 can optionally include that the interference signal model may be one of a group of interference signal models consisting of a Markov process model and a chaotic model.

In Example 19, the subject matter of any one of Examples 1 to 18 can optionally include that the determination circuit and the correction circuit may be configured to determine the interference estimation signal and the corrected interference estimation signal, respectively, based on a nonlinear filtering algorithm of a group of filtering algorithms consisting of an Extended Kalman Filter, a second-order Extended Kalman Filter, an Iterated Kalman Filter, a Quadrature Kalman Filter and an Unscented Kalman Filter.

Example 20 is a communication device. The communication device may include a receiver configured to receive a signal that may include a first signal and a second signal, a first determination circuit configured to determine a first interference estimation signal of the first signal based on an interference signal model, a first correction circuit configured to determine a first corrected interference estimation signal based on the first interference estimation signal and on a first signal sample based on the first signal, a second determination circuit configured to determine a second interference estimation signal of the first signal based on the first corrected interference estimation signal and on the interference signal model, a second correction circuit configured to determine a second corrected interference estimation signal of the first signal based on the second interference estimation signal and on a second signal sample based on the second signal and a subtraction circuit configured to subtract the second corrected interference estimation signal from the first signal.

In Example 21, the subject matter of Example 20 can optionally include that the communication device includes a sample circuit configured to sample the first signal sample of the first signal and the second signal sample of the second signal.

In Example 22, the subject matter of any one of Examples 20 to 21 can optionally include that the first signal sample may be sampled at a first sampling time and the second signal sample may be sampled at a second sampling time after the first sampling time. The first determination circuit may be configured to determine the first interference estimation signal based on a plurality of first interference signal states of the interference signal model that may be associated with the first signal. The first determination circuit may be configured to determine at least one first conditional moment of the first interference signal states that may be associated with the first sampling time based on a first time evolution of at least one time dependent first conditional moment function that may be associated with the interference signal model and may be the at least one first conditional moment if evaluated at the first sampling time. The first interference estimation signal may include the at least one first conditional moment of the first interference signal states. The first correction circuit may be configured to determine at least one first corrected conditional moment that may be associated with the first sampling time based on the at least one first conditional moment and the first signal sample. The first corrected interference estimation signal may include the at least one first corrected conditional moment of the first interference signal states. The second determination circuit may be configured to determine the second interference estimation signal based on second interference signal states of a plurality of second interference signal states of the interference signal model that may be associated with the second signal. The second determination circuit may be configured to determine at least one second conditional moment of the second interference signal states that may be associated with the second sampling time based on the at least one first corrected conditional moment and a second time evolution of at least one time dependent second conditional moment function that may be associated with the interference signal model and may be the at least one second conditional moment if evaluated at the second sampling time. The second interference estimation signal may include the at least one second conditional moment.

In Example 23, the subject matter Example 22 can optionally include that the at least one first conditional moment may be a plurality of first conditional moments that may be associated with the first sampling time. The at least one time dependent first conditional moment function may be a plurality of time dependent first conditional moment functions that may be associated with the interference signal model and may be the first conditional moments if evaluated at the first sampling time, respectively. The first time evolution of the plurality of time dependent first conditional moment functions may be a time evolution in accordance with at least one coupled differential equation that may include the first conditional moment functions of the plurality of time dependent first conditional moment functions. The at least one second conditional moment may be a plurality of second conditional moments that may be associated with the second sampling time. The at least one time dependent second conditional moment function may be a plurality of time dependent second conditional moment functions that may be associated with the interference signal model and may be the second conditional moments if evaluated at the second sampling time, respectively. The second time evolution of the plurality of time dependent second conditional moment functions may be a time evolution in accordance with at least one coupled differential equation that may include the second conditional moment functions of the plurality of time dependent second conditional moment functions.

In Example 24, the subject matter of Example 23 can optionally include that the coupled differential equation may be based on a Fokker-Planck-Kolmogorov equation.

In Example 25, the subject matter of Example 24 can optionally include that the Fokker-Planck-Kolmogorov equation may be continuous in time.

In Example 26, the subject matter of any one of Examples 22 to 25 can optionally include that the at least one first conditional moment function and the at least one second conditional moment function may be conditional averages.

In Example 27, the subject matter of any one of Examples 23 to 26 can optionally include that the plurality of first conditional moments and the plurality of second conditional moments include a conditional variance or a conditional covariance, respectively.

In Example 28, the subject matter of any one of Examples 22 to 27 can optionally include that the communication device may be configured to determine an initial condition of the first time evolution based on the interference signal model.

In Example 29, the subject matter of any one of Examples 23 to 28 can optionally include that the first determination circuit may be configured to determine the at least one first conditional moment based on a first solution of the coupled differential equation that may include a first integral with respect to the time. The first determination circuit may be configured to integrate the first integral numerically. The first determination circuit may be configured to determine processing values of the numerical integration of the first integral at a processing rate that may be higher than a sampling rate at which the first signal sample and the second signal sample may be sampled. The second determination circuit may be configured to determine the at least one second conditional moment based on a second solution of the coupled differential equation that may include a second integral with respect to the time. The second determination circuit may be configured to integrate the second integral numerically. The second determination circuit may be configured to determine processing values of the second numerical integration at the processing rate.

In Example 30, the subject matter of Example 29 can optionally include that the sampling rate corresponds to the Nyquist frequency.

In Example 31, the subject matter of any one of Examples 28 to 30 can optionally include that the at least one first conditional moment may be an expectation value of a state function with respect to first conditional state probabilities that may be Bayesian probabilities of the first interference signal states under a first condition based on the initial condition. The at least one first corrected conditional moment may be an expectation value of the state function with respect to first corrected conditional state probabilities that may be probabilities of the first interference signal states under the first condition and a second condition based on the first signal sample. The at least one second conditional moment may be an expectation value of the state function with respect to second conditional state probabilities that may be Bayesian probabilities of the second interference signal states under the first condition and the second condition. The at least one second corrected conditional moment may be an expectation value of the state function with respect to second corrected conditional state probabilities that may be probabilities of the second interference signal states under the first condition, the second condition and a third condition based on the second signal sample. The at least one second corrected conditional moment may be associated with the second sampling time. The at least one second corrected interference estimation signal may include the second corrected conditional moment.

In Example 32, the subject matter of any one of Examples 22 to 31 can optionally include that the at least one first corrected conditional moment may be a plurality of first corrected conditional moments that each may be first corrected conditional moments of the interference signal states. The first correction circuit may be configured to determine the first corrected conditional moments of the plurality of first corrected conditional moments based on the first conditional moments of the plurality of first conditional moments and the first signal sample. The at least one first corrected conditional moment may be a plurality of first corrected conditional moments that each may be first corrected conditional moments of the interference signal states. The second correction circuit may be configured to determine the second corrected conditional moments of the plurality of second corrected conditional moments based on the second conditional moments of the plurality of second conditional moments and the second signal sample.

In Example 33, the subject matter of any one of Examples 22 to 32 can optionally include that the interference signal model may be one of a group of interference signal models consisting of a Markov process model and a chaotic model.

In Example 34, the subject matter of any one of Examples 1 to 33 can optionally include that the received signal may be a baseband signal.

In Example 35, the subject matter of any one of Examples 1 to 34 can optionally include that the communication device further includes a model selection circuit configured to select a first interference signal model from a plurality of predefined interference signal models based on at least a first statistical property of the received signal that may be different from a white Gaussian noise signal. The interference signal model may be the first interference signal model.

In Example 36, the subject matter of any one of Examples 3 to 36 can optionally include that the interference signal model may include at least one predetermined function that may be a function of at least one of the interference signal states or the time. The determination of at least one of the conditional moment, the first conditional moment, the second conditional moment, the corrected conditional moment, the first corrected conditional moment or the second corrected conditional moment may include at least one output value of the at least one predetermined function. The communication device further may include an evaluation circuit configured to determine the at least one output value of the at least one predetermined function and to transmit the at least one output value to the determination circuit and the correction circuit. The determination circuit may be configured to determine the conditional moment, the first conditional moment or the second conditional moment based on the at least one output value of the at least one predetermined function. The correction circuit may be configured to determine the corrected conditional moment, the first corrected conditional moment or the second corrected conditional moment based on the at least one output value of the at least one predetermined function.

Example 37 is a method for signal determination in radio communication. The method may include receiving a signal, determining an interference estimation signal of the received signal based on an interference signal model, determining a corrected interference estimation signal based on the determined interference estimation signal and on a signal sample based on the received signal and subtracting the corrected interference estimation signal from the received signal.

In Example 38, the subject matter of Example 37 can optionally include that the method further includes sampling the signal sample of the signal.

In Example 39, the subject matter of any one of Examples 37 to 38 can optionally include that the method further includes determining the interference estimation signal in consideration of a plurality of interference signal states of the signal model. The method may further include determining at least one conditional moment of the interference signal states that may be associated with a sampling time of the signal sample based on a time evolution of at least one time dependent conditional moment function that may be associated with the interference signal model and may be the at least one conditional moment if evaluated at the sampling time, wherein the interference estimation signal may include the at least one conditional moment of the interference signal states.

In Example 40, the subject matter of Example 39 can optionally include that the at least one conditional moment may be a plurality of conditional moments that may be associated with the second sampling time. The at least one time dependent conditional moment function may be a plurality of time dependent conditional moment functions that may be associated with the interference signal model and may be the conditional moments if evaluated at the sampling time, respectively. The time evolution of the plurality of time dependent conditional moment functions may be based on at least one coupled differential equation that may include the conditional moment functions of the plurality of time dependent conditional moment functions.

In Example 41, the subject matter of Example 40 can optionally include that the coupled differential equation may be based on a Fokker-Planck-Kolmogorov equation.

In Example 42, the subject matter of Example 41 can optionally include that the Fokker-Planck-Kolmogorov equation may be continuous in time.

In Example 43, the subject matter of any one of Examples 39 to 42 can optionally include that the at least one conditional moment may be a conditional average.

In Example 44, the subject matter of any one of Examples 40 to 43 can optionally include that the plurality of conditional moments may include a conditional variance or a conditional covariance.

In Example 45, the subject matter of any one of Examples 39 to 44 can optionally include that the method further includes determining an initial condition of the time evolution based on the interference signal model.

In Example 46, the subject matter of any one of Examples 40 to 45 can optionally include that the method further includes determining the at least one conditional moment based on a solution of the coupled differential equation that may include an integral with respect to the time. The method further includes integrating the integral numerically. The method further includes determining processing values of the numerical integration of the integral at a processing rate that may be higher than a sampling rate at which the received signal may be sampled.

In Example 47, the subject matter of Example 46 can optionally include that the sampling rate corresponds to the Nyquist frequency.

In Example 48, the subject matter of any one of Examples 39 to 47 can optionally include that the method further includes determining at least one corrected conditional moment based on the at least one conditional moment and the signal sample. The corrected interference estimation signal may include the at least one corrected conditional moment of the interference signal states.

In Example 49, the subject matter of Example 48 can optionally include that the at least one corrected conditional moment may be a corrected conditional average that may be determined based on the conditional average and the signal sample.

In Example 50, the subject matter of any one of Examples 48 to 49 can optionally include that the conditional moment may be an expectation value of a state function with respect to conditional state probabilities that may be Bayesian probabilities of the interference signal states under a first condition based on the initial condition. The at least one corrected conditional moment may be an expectation value of the state function with respect to corrected conditional state probabilities that may be probabilities of the interference signal states under the first condition and a second condition based on the signal sample.

In Example 51, the subject matter of any one of Examples 40 to 50 can optionally include that the at least one corrected conditional moment may be a plurality of corrected conditional moments that each may be corrected conditional moments of the interference signal states. The method may further include determining the corrected conditional moments of the plurality of corrected conditional moments based on the conditional moments of the plurality of conditional moments and the signal sample.

In Example 52, the subject matter of any one of Examples 40 to 51 can optionally include that the interference estimation signal may be a first iteration determination signal, the plurality of conditional moments may be a plurality of first iteration moments, the plurality of conditional moment functions may be a plurality of first iteration moment functions, the corrected interference estimation signal may be a first corrected interference estimation signal, the plurality of corrected conditional moments may be a plurality of first corrected iteration moments and the signal sample may be a first signal sample. The method may further include determining a first iteration correction signal that may include the plurality of first corrected iteration moments. The method may further include sampling a second signal sample of the received signal. The method may further include determining a plurality of second iteration moments of the interference signal states that may be associated with a second sampling time of the second signal sample based on a second time evolution of second iteration moment functions that if evaluated at the second sampling time may be the second iteration moments, respectively, and on the first corrected iteration moments as an initial condition of the time evolution of the second iteration moment functions. The method may further include determining a second iteration determination signal that may include the second iteration moments. The method may further include determining a plurality of second corrected iteration moments of the interference signal states of the plurality of interference signal states based on the second iteration moments and the second signal sample. The method may further include determining a second corrected interference estimation signal that may include at least a single second corrected iteration moment of the second corrected iteration moments. The method may further include subtracting the second corrected interference estimation signal from the received signal.

In Example 53, the subject matter of Example 52 can optionally include that the second time evolution may be based on the Fokker-Planck-Kolmogorov equation. The Fokker-Planck-Kolmogorov equation may include the second iteration moments of the plurality of second iteration moment functions.

In Example 54, the subject matter of any one of Examples 39 to 53 can optionally include that the interference signal model may be one of a group of interference signal models consisting of a Markov process model and a chaotic model.

In Example 55, the subject matter of any one of Examples 46 to 54 can optionally include that the method further includes determining the interference estimation signal and the corrected interference estimation signal based on a nonlinear filtering algorithm of a group of filtering algorithms consisting of an Extended Kalman Filter, a second-order Extended Kalman Filter, an Iterated Kalman Filter, a Quadrature Kalman Filter and an Unscented Kalman Filter.

Example 56 is a method for signal determination in radio communication. The method may include receiving a signal that may include a first signal and a second signal, determining a first interference estimation signal of the first signal based on an interference signal model, determining a first corrected interference estimation signal based on the first interference estimation signal and on a first signal sample based on the first signal, determining a second interference estimation signal of the first signal based on the first corrected interference estimation signal and on the interference signal model, determining a second corrected interference estimation signal of the first signal based on the second interference estimation signal and on a second signal sample based on the second signal and subtracting the second corrected interference estimation signal from the first signal.

In Example 57, the subject matter of Examples 56 can optionally include that the method further includes sampling the first signal sample of the first signal and the second signal sample of the second signal.

In Example 57, the subject matter of any one of Examples 56 to 57 can optionally include that the first signal sample may be sampled at a first sampling time and the second signal sample may be sampled at a second sampling time after the first sampling time. The method may further include determining the first interference estimation signal based on first interference signal states of a plurality of first interference signal states of the interference signal model that may be associated with the first signal, determining at least one first conditional moment of the first interference signal states that may be associated with the first sampling time based on a first time evolution of at least one time dependent first conditional moment function that may be associated with the interference signal model and may be the at least one first conditional moment if evaluated at the first sampling time, wherein the first interference estimation signal may include the at least one first conditional moment of the first interference signal states. The method may further include determining at least one first corrected conditional moment based on the at least one first conditional moment and the first signal sample, wherein the first corrected interference estimation signal may include the at least one first corrected conditional moment of the first interference signal states, determining the second interference estimation signal based on second interference signal states of a plurality of second interference signal states of the interference signal model that may be associated with the second signal and determining at least one second conditional moment of the second interference signal states that may be associated with the second sampling time based on the at least one first corrected conditional moment and a second time evolution of at least one time dependent second conditional moment function that may be associated with the interference signal model and may be the at least one second conditional moment if evaluated at the second sampling time, wherein the second interference estimation signal may include the at least one second conditional moment.

In Example 59, the subject matter of Example 58 can optionally include that the at least one first conditional moment may be a plurality of first conditional moments that may be associated with the first sampling time. The at least one time dependent first conditional moment function may be a plurality of time dependent first conditional moment functions that may be associated with the interference signal model and may be the first conditional moments if evaluated at the second sampling time, respectively. The first time evolution of the plurality of time dependent first conditional moment functions may be a time evolution in accordance with at least one coupled differential equation that may include the first conditional moment functions of the plurality of time dependent first conditional moment functions. The at least one second conditional moment may be a plurality of second conditional moments that may be associated with the second sampling time. The at least one time dependent second conditional moment function may be a plurality of time dependent second conditional moment functions that may be associated with the interference signal model and may be the second conditional moments if evaluated at the second sampling time, respectively. The second time evolution of the plurality of time dependent second conditional moment functions may be a time evolution in accordance with at least one coupled differential equation that may include the second conditional moment functions of the plurality of time dependent second conditional moment functions.

In Example 60, the subject matter of Example 59 can optionally include that the coupled differential equation may be based on a Fokker-Planck-Kolmogorov equation.

In Example 61, the subject matter of Example 60 can optionally include that the Fokker-Planck-Kolmogorov equation may be continuous in time.

In Example 62, the subject matter of any one of Examples 59 to 61 can optionally include that the at least one first conditional moment function and the at least one second conditional moment function may be conditional averages.

In Example 63, the subject matter of any one of Examples 60 to 62 can optionally include that the plurality of first conditional moments and the plurality of second conditional moments include a conditional variance or a conditional covariance, respectively.

In Example 64, the subject matter of any one of Examples 59 to 63 can optionally include that the method further includes determining an initial condition of the first time evolution based on the interference signal model.

In Example 65, the subject matter of any one of Examples 59 to 64 can optionally include that the method further includes determining the at least one first conditional moment based on a first solution of the coupled differential equation that may include a first integral with respect to the time, integrating the first integral numerically and determining processing values of the numerical integration of the first integral at a processing rate that may be higher than a sampling rate at which the first signal sample and the second signal sample may be sampled. The method may further include determining the at least one second conditional moment based on a second solution of the coupled differential equation that may include a second integral with respect to the time, integrating the second integral numerically and determining processing values of the second numerical integration at the processing rate.

In Example 66, the subject matter of Example 65 can optionally include that the sampling rate corresponds to the Nyquist frequency.

In Example 67, the subject matter of any one of Examples 59 to 66 can optionally include that the at least one first conditional moment may be an expectation value of a state function with respect to first conditional state probabilities that may be Bayesian probabilities of the first interference signal states under a first condition based on the initial condition. The at least one first corrected conditional moment may be an expectation value of the state function with respect to first corrected conditional state probabilities that may be probabilities of the first interference signal states under the first condition and a second condition based on the second signal sample. The at least one second conditional moment may be an expectation value of the state function with respect to second conditional state probabilities that may be Bayesian probabilities of the second interference signal states under the first condition and the second condition. The at least one second corrected conditional moment may be an expectation value of the state function with respect to second corrected conditional state probabilities that may be probabilities of the second interference signal states under the first condition, the second condition and a third condition based on the second signal sample. The at least one second corrected conditional moment may be associated with the second sampling time. The at least one second corrected interference estimation signal may include the second corrected conditional moment.

In Example 68, the subject matter of any one of Examples 59 to 67 can optionally include that the at least one first corrected conditional moment may be a plurality of first corrected conditional moments that each may be first corrected conditional moments of the interference signal states. The first correction circuit may be configured to determine the first corrected conditional moments of the plurality of first corrected conditional moments based on the first conditional moments of the plurality of first conditional moments and the first signal sample. The at least one first corrected conditional moment may be a plurality of first corrected conditional moments that each may be first corrected conditional moments of the interference signal states. The second correction circuit may be configured to determine the second corrected conditional moments of the plurality of second corrected conditional moments based on the second conditional moments of the plurality of second conditional moments and the second signal sample.

In Example 69, the subject matter of any one of Examples 59 to 68 can optionally include that the interference signal model may be one of a group of interference signal models consisting of a Markov process model and a chaotic model.

In Example 70, the subject matter of any one of Examples 37 to 69 can optionally include that the received signal may be a baseband signal.

In Example 71, the subject matter of any one of Examples 37 to 70 can optionally include that the method further includes selecting a first interference signal model from a plurality of predefined interference signal models based on at least a first statistical property of the received signal that may be different from a white Gaussian noise signal, wherein the interference signal model may be the first interference signal model.

In Example 72, the subject matter of any one of Examples 39 to 71 can optionally include that the interference signal model may include at least one predetermined function that may be a function of at least one of the interference signal states or the time. The determination of at least one of the conditional moment, the first conditional moment, the second conditional moment, the corrected conditional moment, the first corrected conditional moment or the second corrected conditional moment may include at least one output value of the at least one predetermined function. The method may further include determining the at least one output value of the at least one predetermined function and transmitting the at least one output value to the determination circuit and the correction circuit. The method may further include determining the conditional moment, the first conditional moment or the second conditional moment based on the at least one output value of the at least one predetermined function and determining the corrected conditional moment, the first corrected conditional moment or the second corrected conditional moment based on the at least one output value of the at least one predetermined function.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
a receiver configured to receive a signal;
a determination circuit configured to determine an interference estimation signal of the received signal based on an interference signal model;
a correction circuit configured to determine a corrected interference estimation signal based on the determined interference estimation signal and on a signal sample based on the received signal; and
a subtraction circuit configured to subtract the corrected interference estimation signal from the received signal,
wherein the determination circuit is configured to determine the interference estimation signal based on interference signal states of a plurality of interference signal states of the interference signal model, wherein the determination circuit is configured to determine at least one conditional moment of the interference signal states associated with a sampling time of the signal sample based on a time evolution of at least one time dependent conditional moment function associated with the interference signal model.

2. The communication device of claim 1,
wherein the at least one condition moment is the at least one conditional moment if evaluated at the sampling time; and
wherein the determined interference estimation signal includes the at least one conditional moment of the interference signal states.

3. The communication device of claim 2,
wherein the at least one conditional moment is a plurality of conditional moments that are associated with the sampling time;
wherein the at least one time dependent conditional moment function is a plurality of time dependent conditional moment functions associated with the interference signal model and are the conditional moments if evaluated at the sampling time, respectively; and
wherein the time evolution of the plurality of time dependent conditional moment functions is based on at least one coupled differential equation that includes the conditional moment functions of the plurality of time dependent conditional moment functions.

4. The communication device of claim 3,
wherein the coupled differential equation is based on a Fokker-Planck-Kolmogorov equation.

5. The communication device of claim 4,
wherein the at least one conditional moment is a conditional average.

6. The communication device of claim 5,
wherein the plurality of conditional moments includes a conditional variance or a conditional covariance.

7. The communication device of claim 6,
wherein the determination circuit is configured to determine the at least one conditional moment based on a solution of the coupled differential equation that includes an integral with respect to the time;
wherein the determination circuit is configured to integrate the integral numerically; and
wherein the determination circuit is configured to determine processing values of the numerical integration of the integral at a processing rate that is higher than a sampling rate of the sample circuit.

8. The communication device of claim 7,
wherein the correction circuit is configured to determine at least one corrected conditional moment based on the at least one conditional moment and the signal sample; and wherein the corrected interference estimation signal includes the at least one corrected conditional moment of the interference signal states.

9. The communication device of claim 8, wherein the interference signal model is one of a group of interference signal models consisting of:
   a Markov process model; and
   a chaotic model.

10. The communication device of claim 9, wherein the determination circuit and the correction circuit are configured to determine the interference estimation signal and the corrected interference estimation signal, respectively, based on a nonlinear filtering algorithm of a group of filtering algorithms consisting of:
   an Extended Kalman Filter;
   a second-order Extended Kalman Filter;
   an Iterated Kalman Filter;
   a Quadrature Kalman Filter; and
   an Unscented Kalman Filter.

11. A communication device, comprising:
   a receiver configured to receive a signal that comprises a first signal and a second signal;
   a first determination circuit configured to determine a first interference estimation signal of the first signal based on an interference signal model;
   a first correction circuit configured to determine a first corrected interference estimation signal based on the first interference estimation signal and on a first signal sample based on the first signal;
   a second determination circuit configured to determine a second interference estimation signal of the first signal based on the first corrected interference estimation signal and on the interference signal model;
   a second correction circuit configured to determine a second corrected interference estimation signal of the first signal based on the second interference estimation signal and on a second signal sample based on the second signal; and
   a subtraction circuit configured to subtract the second corrected interference estimation signal from the first signal.

12. The communication device of claim 11, wherein the first signal sample is sampled at a first sampling time and the second signal sample is sampled at a second sampling time after the first sampling time;
   wherein the first determination circuit is configured to determine the first interference estimation signal based on a plurality of first interference signal states of the interference signal model that are associated with the first signal;
   wherein the first determination circuit is configured to determine at least one first conditional moment of the first interference signal states that is associated with the first sampling time based on a first time evolution of at least one time dependent first conditional moment function that is associated with the interference signal model and is the at least one first conditional moment if evaluated at the first sampling time;
   wherein the first interference estimation signal includes the at least one first conditional moment of the first interference signal states;
   wherein the first correction circuit is configured to determine at least one first corrected conditional moment that is associated with the first sampling time based on the at least one first conditional moment and the first signal sample;
   wherein the first corrected interference estimation signal includes the at least one first corrected conditional moment of the first interference signal states;
   wherein the second determination circuit is configured to determine the second interference estimation signal based on second interference signal states of a plurality of second interference signal states of the interference signal model that are associated with the second signal;
   wherein the second determination circuit is configured to determine at least one second conditional moment of the second interference signal states that is associated with the second sampling time based on the at least one first corrected conditional moment and a second time evolution of at least one time dependent second conditional moment function that is associated with the interference signal model and is the at least one second conditional moment if evaluated at the second sampling time; and
   wherein the second interference estimation signal includes the at least one second conditional moment.

13. The communication device of claim 12, wherein the at least one first conditional moment is a plurality of first conditional moments that are associated with the first sampling time;
   wherein the at least one time dependent first conditional moment function is a plurality of time dependent first conditional moment functions that are associated with the interference signal model and are the first conditional moments if evaluated at the first sampling time, respectively;
   wherein the first time evolution of the plurality of time dependent first conditional moment functions is a time evolution in accordance with at least one coupled differential equation that includes the first conditional moment functions of the plurality of time dependent first conditional moment functions;
   wherein the at least one second conditional moment is a plurality of second conditional moments that are associated with the second sampling time;
   wherein the at least one time dependent second conditional moment function is a plurality of time dependent second conditional moment functions that are associated with the interference signal model and are the second conditional moments if evaluated at the second sampling time, respectively; and
   wherein the second time evolution of the plurality of time dependent second conditional moment functions is a time evolution in accordance with at least one coupled differential equation that includes the second conditional moment functions of the plurality of time dependent second conditional moment functions.

14. The communication device of claim 13, wherein the coupled differential equation is based on a Fokker-Planck-Kolmogorov equation.

15. The communication device of claim 14, wherein the first determination circuit is configured to determine the at least one first conditional moment based on a first solution of the coupled differential equation that includes a first integral with respect to the time;
   wherein the first determination circuit is configured to integrate the first integral numerically; and
   wherein the first determination circuit is configured to determine processing values of the numerical integration of the first integral at a processing rate that is higher than a sampling rate at which the first signal sample and the second signal sample are sampled;

wherein the second determination circuit is configured to determine the at least one second conditional moment based on a second solution of the coupled differential equation that includes a second integral with respect to the time;

wherein the second determination circuit is configured to integrate the second integral numerically; and wherein the second determination circuit is configured to determine processing values of the second numerical integration at the processing rate.

16. The communication device of claim 15, wherein the interference signal model is one of a group of interference signal models consisting of:

a Markov process model; and a chaotic model.

17. The communication device of claim 16, further comprising:

a model selection circuit configured to select a first interference signal model from a plurality of predefined interference signal models based on at least a first statistical property of the received signal that is different from a white Gaussian noise signal, wherein the interference signal model is the first interference signal model.

18. A method for signal determination in radio communication, comprising:

receiving a signal;

determining an interference estimation signal of the received signal based on an interference signal model, wherein the interference estimation signal is determined in consideration of a plurality of interference signal states of the signal model and comprises determining at least one conditional moment of the interference signal states that is associated with a sampling time of the signal sample based on a time evolution of at least one time dependent conditional moment function that is associated with the interference signal model;

determining a corrected interference estimation signal based on the determined interference estimation signal and on a signal sample based on the received signal; and subtracting the corrected interference estimation signal from the received signal.

19. The method of any one of claim 18, further comprising:

wherein the at least one condition moment is the at least one conditional moment if evaluated at the sampling time, wherein the interference estimation signal includes the at least one conditional moment of the interference signal states.

20. The method of claim 19, wherein the at least one conditional moment is a plurality of conditional moments that are associated with the second sampling time;

wherein the at least one time dependent conditional moment function is a plurality of time dependent conditional moment functions that are associated with the interference signal model and are the conditional moments if evaluated at the sampling time, respectively; and wherein the time evolution of the plurality of time dependent conditional moment functions is based on at least one coupled differential equation that includes the conditional moment functions of the plurality of time dependent conditional moment functions.

21. The method of claim 20, wherein the coupled differential equation is based on a Fokker-Planck-Kolmogorov equation.

22. The method of claim 21, further comprising:

determining the at least one conditional moment based on a solution of the coupled differential equation that includes an integral with respect to the time;

integrating the integral numerically; and determining processing values of the numerical integration of the integral at a processing rate that is higher than a sampling rate at which the received signal is sampled.

23. The method of claim 22, wherein the interference signal model is one of a group of interference signal models consisting of:

a Markov process model; and a chaotic model.

24. A method for signal determination in radio communication, comprising:

receiving a signal that comprises a first signal and a second signal;

determining a first interference estimation signal of the first signal based on an interference signal model;

determining a first corrected interference estimation signal based on the first interference estimation signal and on a first signal sample based on the first signal;

determining a second interference estimation signal of the first signal based on the first corrected interference estimation signal and on the interference signal model;

determining a second corrected interference estimation signal of the first signal based on the second interference estimation signal and on a second signal sample based on the second signal; and subtracting the second corrected interference estimation signal from the first signal.

25. The method of claim 24, wherein the first signal sample is sampled at a first sampling time and the second signal sample is sampled at a second sampling time after the first sampling time; and wherein the method further comprises:

determining the first interference estimation signal based on first interference signal states of a plurality of first interference signal states of the interference signal model that are associated with the first signal;

determining at least one first conditional moment of the first interference signal states that is associated with the first sampling time based on a first time evolution of at least one time dependent first conditional moment function that is associated with the interference signal model and is the at least one first conditional moment if evaluated at the first sampling time, wherein the first interference estimation signal includes the at least one first conditional moment of the first interference signal states;

determining at least one first corrected conditional moment based on the at least one first conditional moment and the first signal sample, wherein the first corrected interference estimation signal includes the at least one first corrected conditional moment of the first interference signal states;

determining the second interference estimation signal based on second interference signal states of a plurality of second interference signal states of the interference signal model that are associated with the second signal; and determining at least one second conditional moment of the second interference signal states that is associated with the second sampling time based on the at least one first corrected conditional moment and a second time evolution of at least one time dependent second conditional moment function that is associated with the interference signal model and is the at least one second conditional moment if evaluated at the second sampling time, wherein the second interference estimation signal includes the at least one second conditional moment.

* * * * *